(12) United States Patent  
Takahashi et al.

(10) Patent No.: US 7,349,150 B2  
(45) Date of Patent: Mar. 25, 2008

(54) OPTICAL TERMINAL APPARATUS

(75) Inventors: Tsukasa Takahashi, Yokohama (JP); Hiroto Ikeda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/044,232

(22) Filed: Jan. 28, 2005

(65) Prior Publication Data

US 2006/0082866 A1 Apr. 20, 2006

(30) Foreign Application Priority Data

Oct. 15, 2004 (JP) ............... 2004-302262

(51) Int. Cl.
*H01S 3/00* (2006.01)
*H04J 14/08* (2006.01)

(52) U.S. Cl. ............... 359/341.3; 359/341.2; 398/92

(58) Field of Classification Search .......... 359/341.3, 359/341.2; 398/92
See application file for complete search history.

(56) References Cited

U.S. PATENT DOCUMENTS 5,742,416 A * 4/1998 Mizrahi .............. 398/92
6,657,776 B2 * 12/2003 Gehlot .............. 359/334
6,970,650 B2 * 11/2005 Kajiya et al. .......... 398/92
2003/0081290 A1 5/2003 Kinjo et al.

FOREIGN PATENT DOCUMENTS

JP 2003-134057 5/2003

OTHER PUBLICATIONS

Reference AG (Japanese Patent Application 2003-134057 dated May 9, 2003) corresponds to Reference AA (United States Patent Application Publication No. 2003/81290 dated May 2, 2003).

* cited by examiner

*Primary Examiner*—Mark Hellner
(74) *Attorney, Agent, or Firm*—Staas & Halsey LLP

(57) ABSTRACT

An optical terminal apparatus includes a plurality of signal light units that transmits and receives a signal light having a predetermined wavelength; at least one pumping light unit that emits a pumping light having a predetermined wavelength to perform Raman amplification for the signal light transmitted; and an optical multiplexer/demultiplexer that multiplexes/demultiplexes the signal light and the pumping light, the optical multiplexer/demultiplexer having one end connected to an optical transmission path and other end connected to the signal light units and the pumping light unit.

25 Claims, 24 Drawing Sheets

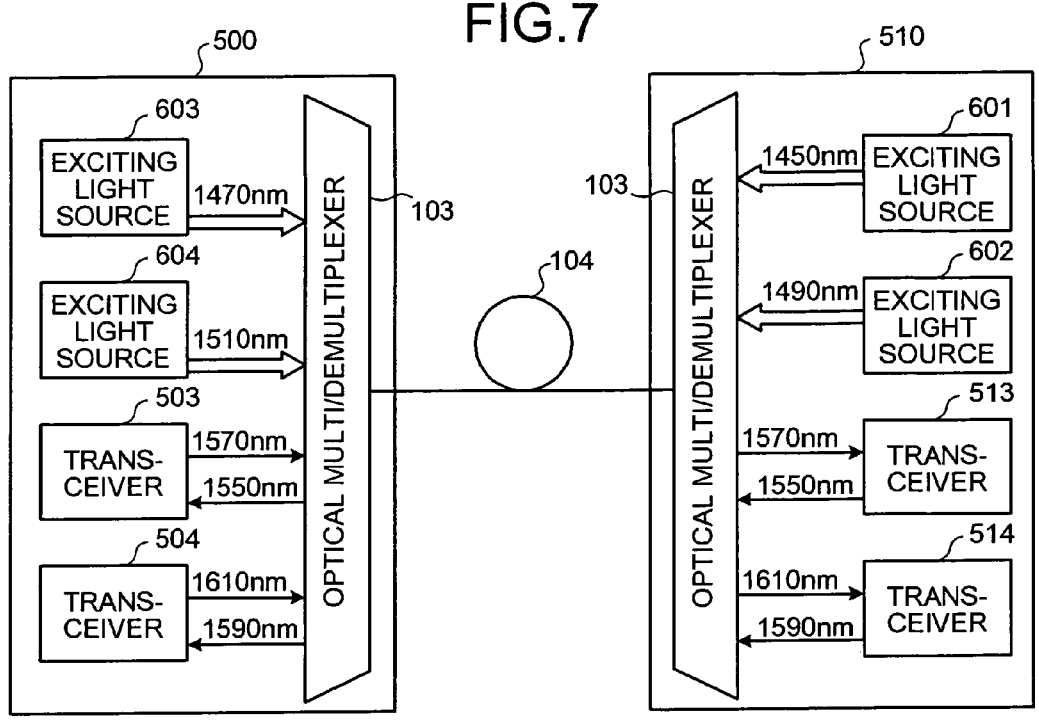
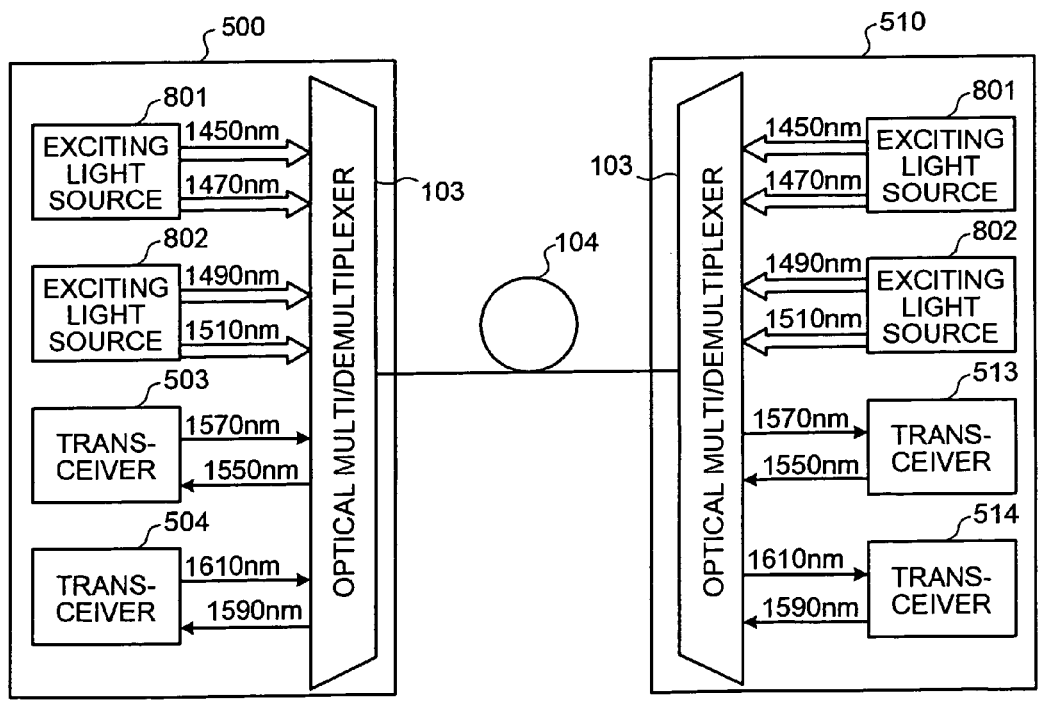

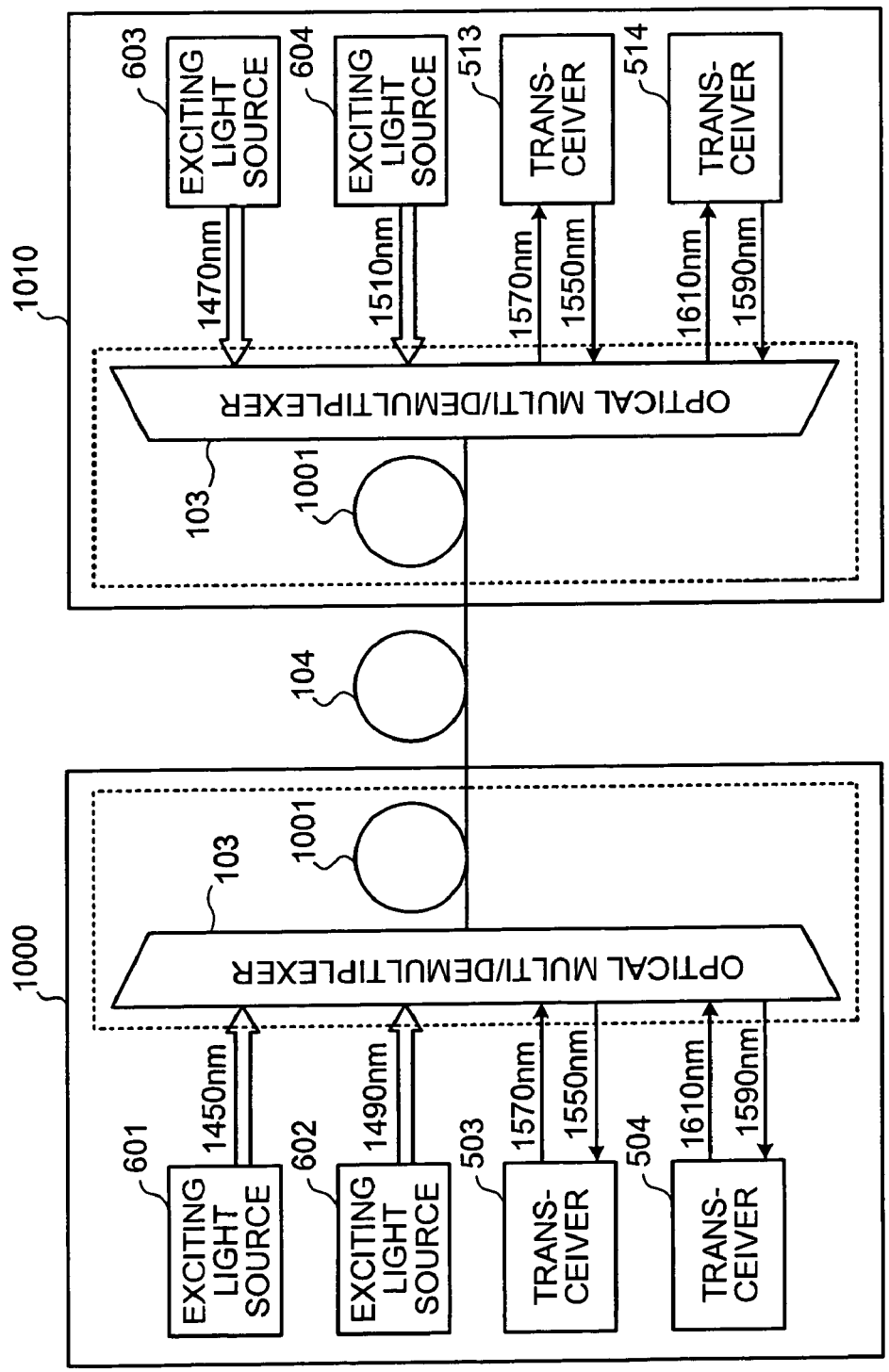

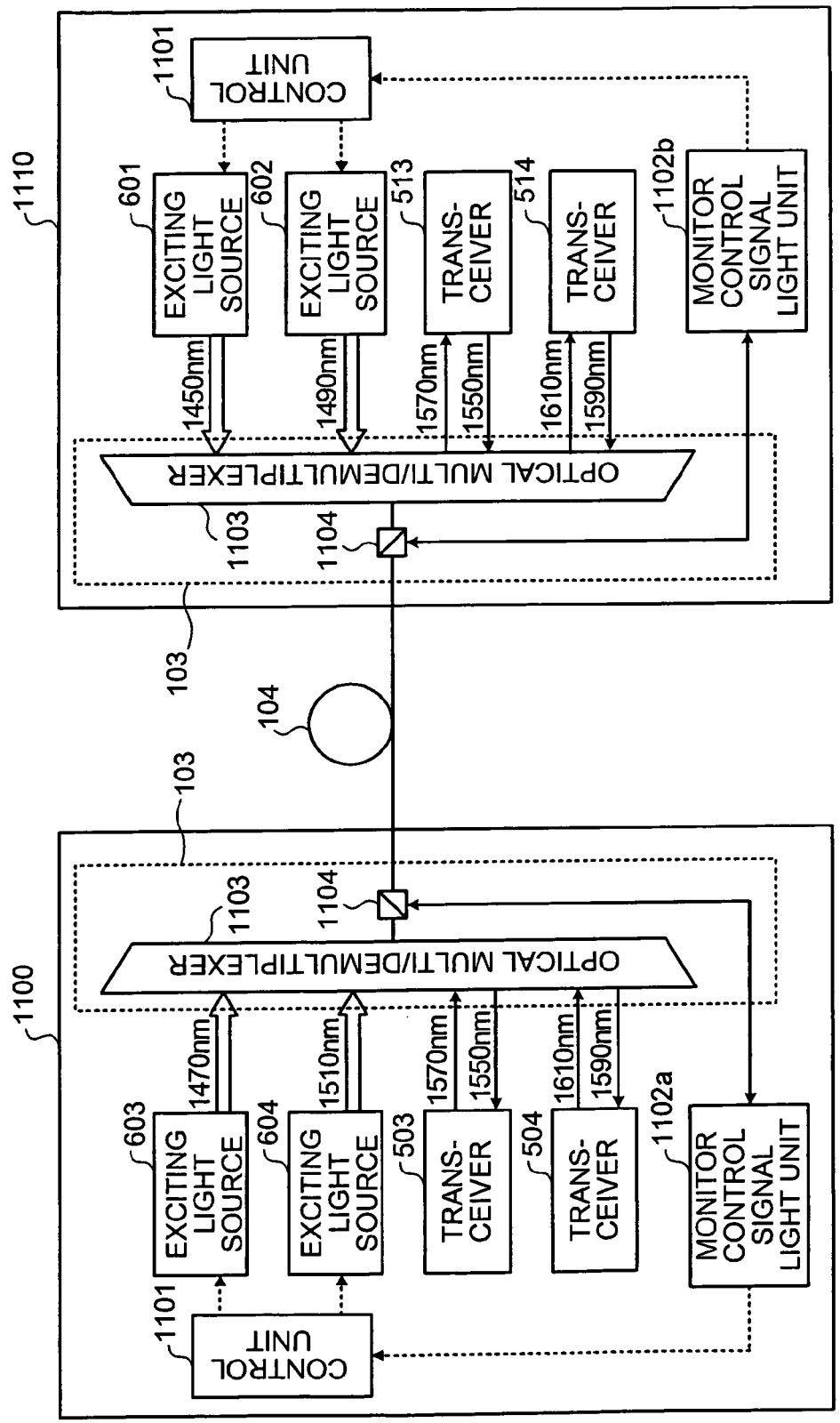

FIG.15B

| EXCITING LIGHT SOURCE 1 | EXCITING LIGHT SOURCE 2 | OPTICAL SECTION |
|---|---|---|
| 1480nm | 1460nm | OPTICAL MULTI/DEMULTIPLEXER |
| 1480nm | 1480nm | PBS |
| 980nm | 980nm | PBS |

○ CONNECTOR CONNECTION POINT

○ CONNECTER CONNECTION POINT

OPTICAL TERMINAL APPARATUS

CROSS-REFERENCE TO RELATED APPLICATIONS

This application is based upon and claims the benefit of priority from the prior Japanese Patent Application No. 2004-302262, filed on Oct. 15, 2004, the entire contents of which are incorporated herein by reference.

BACKGROUND OF THE INVENTION

1) Field of the Invention

The present invention relates to an optical terminal apparatus that amplifies a signal light by using Raman amplification or an erbium-doped optical fiber amplifier (EDFA).

2) Description of the Related Art

In an optical transmission system using an optical fiber, a multiplexing technique for a signal light by using a wavelength division multiplexing (WDM) to effectively use a transmission path is popularly used. This technique multiplexes light by using a property in which lights having different wavelengths do not interfere with each other. In the WDM optical transmission system, by factors such as an amplification band of an available optical amplifier, and the transmission characteristics of optical sections or an optical fiber, a wavelength band which can be substantially used is limited. A dense wavelength division multiplexing (DWDM) in which inter-signal-light wavelength interval in the WDM is set at 0.8 nm or less (such as 200 GHz and 100 GHz) to multiplex signal lights having 16 different wavelengths is used.

A transmission distance of a signal light is determined by an output in signal light transmission, a loss generated in a transmission path, nonlinear limit, wavelength dispersion, and the like. However, when a repeater having an optical amplifier arranged on an optical path to make it possible to compensate for a signal light level by a loss of the transmission path and to extend the transmission distance. The optical amplifiers includes an optical fiber amplifier which uses an amplification effect obtained by adding a pumping light to an optical fiber added with a rare-earth element and a Raman amplifier which uses a fiber Raman effect obtained by pumping light.

FIG. 20 is a diagram of a configuration which perform Raman amplifier in DWDM optical transmission. As a technique which extends a transmission distance without using a repeater, an optical transmission device in which a pumping light source unit for a Raman amplifier is arranged to insert a pumping light into a transmission path is known (see, for example, Japanese Unexamined Patent Publication No. 2003-134057). In FIG. 20, an optical transmission device 2000 is constituted by an optical multiplexer/demultiplexer 2001 and a plurality of receivers 2002 (2002a to 2002n) corresponding to wavelengths ($\lambda 1$ to $\lambda n$) of signal lights to be handled.

Raman amplification is an amplification technique which uses an induced emission phenomenon based on Raman scattering in which amplification is performed in a wavelength band having a wavelength 100 nm longer than the wavelength of a pumping light input to a transmission path 2010. Since the wavelength interval is extremely small, i.e., about 0.8 nm, as shown in FIG. 20, pumping light units the number of which is considerably smaller than the number of signal lights ($\lambda 1$ to $\lambda n$) (n wavelengths) are arranged to make it possible to perform Raman amplification to all the signal lights ($\lambda 1$ to $\lambda n$).

In a DWDM optical transmission system, signal lights are multiplexed at small wavelength intervals in an available wavelength band, and a signal wavelength is required to be highly stabilized to prevent an adjacent wavelength from being adversely affected. More specifically, expensive optical sections having high wavelength stability, a large-scale apparatus, and technical experts skilled in the art are required. On the other hand, when coarse wavelength division multiplexing (CWDM) in which a wavelength interval of signal lights to be multiplexed is set to be large to generally multiplex signal lights having 8 to 16 wavelengths for one optical fiber is used, a transmission system which includes inexpensive optical sections and can relatively easily make maintenance can be achieved. However, when Raman amplification is performed to extend a reaching distance, a band of a signal light to be amplified becomes wide because a wavelength interval between signal lights of the CWDM, i.e., 10 nm to 60 nm, a band wider than the band covered by the DWDM can be covered. For this reason, a large number of pumping light sources are required. Therefore, a Raman amplifier unit disadvantageously increases in size, and the cost of the pumping light sources disadvantageously increases.

SUMMARY OF THE INVENTION

It is an object of the present invention to solve at least the above problems in the conventional technology.

An optical terminal apparatus according to one aspect of the present invention includes a plurality of signal light units that transmits and receives a signal light having a predetermined wavelength; at least one pumping light unit that emits a pumping light having a predetermined wavelength to perform Raman amplification for the signal light transmitted; and an optical multiplexer/demultiplexer that multiplexes/demultiplexes the signal light and the pumping light, the optical multiplexer/demultiplexer having one end connected to an optical transmission path and other end connected to the signal light units and the pumping light unit.

An optical terminal apparatus according to another aspect of the present invention includes a plurality of signal light units that transmits and receives a signal light having a predetermined wavelength; an erbium-doped fiber amplifier that includes an erbium-doped fiber, a pumping light source that inputs a pumping light of a predetermined wavelength to the erbium-doped fiber, and a first optical multiplexer/demultiplexer that is arranged between the erbium-doped fiber and the pumping light source, and multiplexes/demultiplexes the signal light and the pumping light; and a second optical multiplexer/demultiplexer multiplexes/demultiplexes signal lights transmitted and received by the signal light units, the second optical multiplexer/demultiplexer having one end connected to the first optical multiplexer/demultiplexer and other end connected to the signal light units.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a diagram of a second connection configuration of pumping light source unit for Raman amplification;

FIG. 8 is a diagram of a third connection configuration of pumping light source unit for Raman amplification;

FIG. 10 is a diagram of an optical terminal device in which an amplification optical fiber is mounted;

FIG. 11 is a diagram of an optical terminal apparatus when pumping light source control is performed;

FIG. 15B is a table of settings of two wavelengths and optical sections;

DETAILED DESCRIPTION

Exemplary embodiments of an optical terminal apparatus according to the present invention will be described in detail below with reference to the accompanying drawings. A first embodiment of the present invention includes a configuration related to amplification of a signal light by using Raman amplification, a second embodiment of the present invention includes a configuration related to amplification of a signal light using an EDFA (Erbium Doped fiber Amplifier), and a third embodiment of the present invention relates to amplification of a signal light by using both the Raman amplification and the EDFA.

Figure 1:
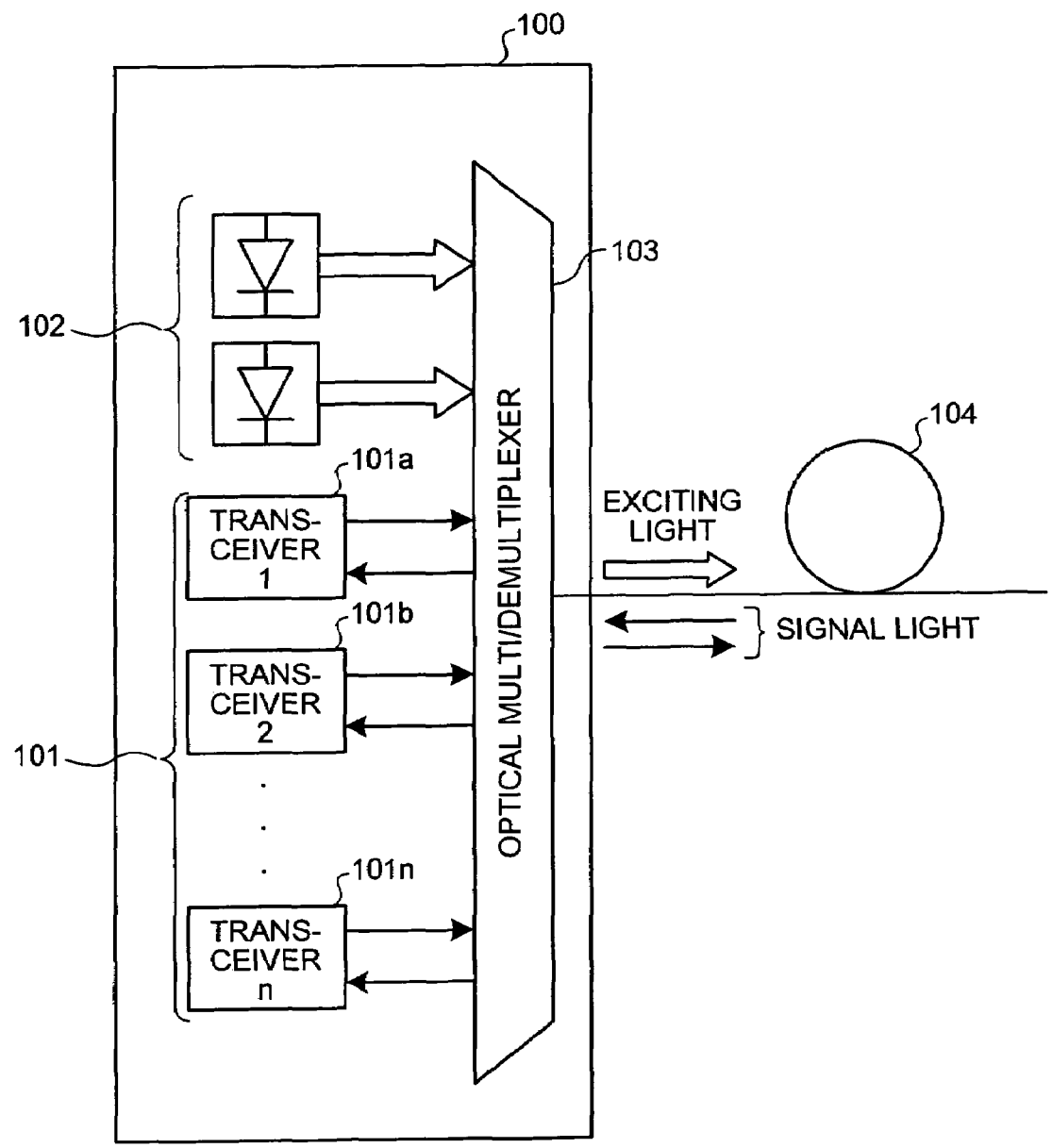
FIG. 1 is a diagram of a basic configuration of an optical terminal apparatus according to a first embodiment of the present invention.

FIG. 1 is a diagram of a basic configuration of an optical terminal apparatus according to the first embodiment. An optical terminal apparatus 100 shown in FIG. 1 includes transceivers 101 (101a to 101n) which transmit and receive signal lights, a pumping light source 102 which supplies a pumping light to perform Raman amplification, and an optical multiplexer/demultiplexer 103. The optical terminal apparatus 100 transmits and receives a signal light through a transmission path (optical transmission path) 104 constituted by an optical fiber.

The optical multiplexer/demultiplexer 103 multiplexes wavelengths of signal lights having different wavelengths and output from the transceivers 101, outputs the multiplexed signal light to the transmission path 104, and demultiplexes the wavelength of a WDM light received from the transmission path 104. An arrow in FIG. 1 indicates a light traveling direction, an arrow in solid line indicates a signal light, and a heavy-line blank arrow indicates a pumping light. As shown in FIG. 1, a signal light and a pumping light are output from the optical terminal apparatus 100 to the transmission path 104 to perform Raman amplification. Since signal lights sent from an opposing optical terminal apparatus (not shown) is also transmitted in the optical fiber serving as the transmission path 104, Raman amplification is also performed to the signal light sent from the opposing optical terminal apparatus. Classification of amplification methods by traveling directions of a signal light and pumping light will be described later.

Figure 2:
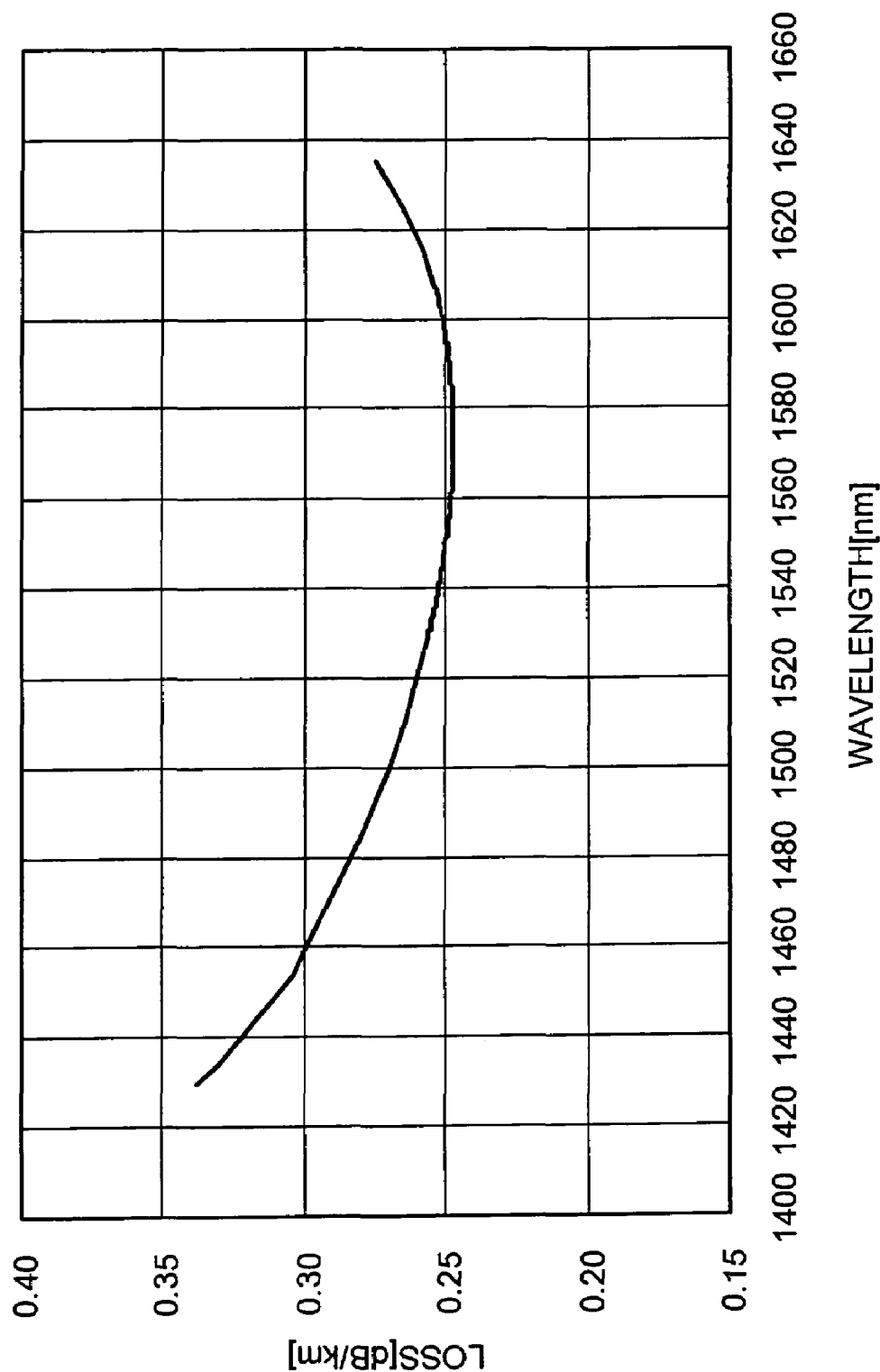
FIG. 2 is a graph of wavelength characteristics of a loss of a single-mode optical fiber.

FIG. 2 is a graph a wavelength dependence loss of a single-mode optical fiber. The abscissa indicates an optical wavelength (nm), and the ordinate indicates a loss (db/km) per kilometer. In CWDM, a light having a wavelength in a wide band, i.e., a 1300-nm band to a 1600-nm band is generally used. However, in the first to third embodiments of the present invention, an optical transmission system using a wavelength in a 1400-nm band to a 1600-nm band will be described below.

In a CWDM transmission system to which the optical terminal apparatus according to the first embodiment is connected, eight wavelengths, i.e., 1450 nm, 1470 nm, 1490 nm, 1510 nm, 1550 nm, 1570 nm, 1590 nm, and 1610 nm are used. Since a light having one of the eight wavelengths is transmitted to or received from the transceivers 101, the optical multiplexer/demultiplexer 103 has a characteristic feature which multiplexes and demultiplexes lights having the eight wavelengths. As a unit connected to the optical multiplexer/demultiplexer 103, any one of a signal light unit or a pumping light source unit is arranged. In the signal light unit, two signal light units for transmission and reception constitute one transceiver. The pumping light unit serves as a pumping light source. As the signal light units in the transceiver, an E/O (electrical/optical conversion) unit for transmission and an O/E (optical/electrical conversion) unit for reception are arranged.

The optical terminal apparatus according to the first embodiment has the following configuration. That is, when a signal light intensity is sufficient, and when a signal light need not be amplified, transmission using a signal light unit is performed. When a signal light intensity is not sufficient with respect to some wavelength, the pumping light source unit is connected to the optical multiplexer/demultiplexer to perform Raman amplification to make it possible to transmission.

Figure 3A:
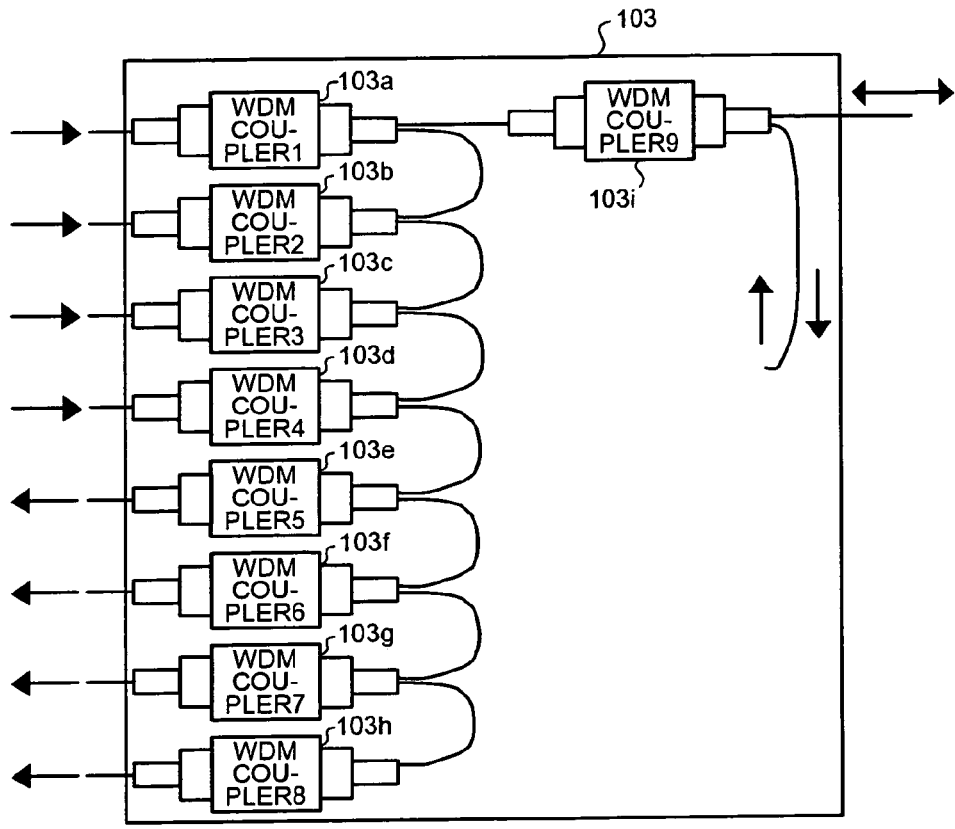
FIG. 3A is a diagram of an internal structure of an optical multiplexer/demultiplexer.

FIG. 3A is a diagram of an internal structure of an optical multiplexer/demultiplexer popularly used in CWDM. As shown in FIG. 3A, the optical multiplexer/demultiplexer 103 is constituted by WDM couplers 1 to 8 (103a to 103h) arranged in relation to respective light sources and a signal WDM coupler 9 (103i) which demultiplexes a signal light input from a transmission path first. Each of the WDM couplers 1 to 4 (103a to 103d) has a multiplexing function that inputs light having a specific wavelength through a specific port and outputs the light from the same port, and inputs a multiplexed WDM light to the transmission path.

On the other hand, each of the WDM couplers 5 to 8 (103e to 103h) includes a band separation filter and has a demultiplexing function that separately outputs lights having a plurality of wavelengths to make it possible to receive only a light having a specific wavelength in the WDM lights input from the transmission path to the optical multiplexer/demultiplexer 103. The WDM coupler 9 (103i) is used to demultiplex a control signal light required for an optical station apparatus having a pumping light source control function (to be described later).

Figure 3B:
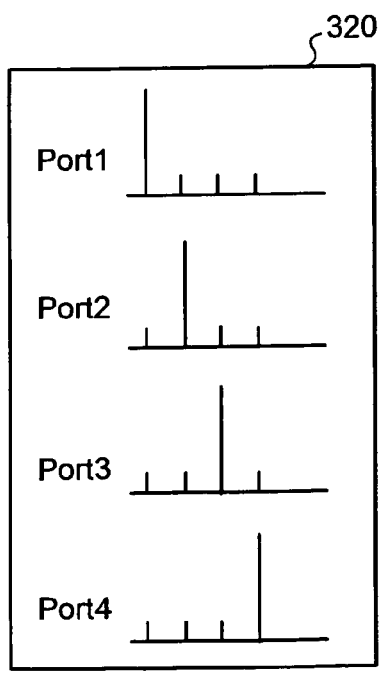
FIG. 3B is a diagram of demultiplexing performed in an optical multiplexer/demultiplexer.

FIG. 3B is a diagram of demultiplexing performed in the optical multiplexer/demultiplexer. As indicated by 320 in FIG. 3B, wavelengths are extracted to the respective ports (Ports) by the WDM couplers 5 to 8 (103e to 103h). The signal light unit for reception arranged in the transceiver 101 (101a to 101n) functions as a receiver to receive a light extracted for each port as a signal light and to convert the signal light into an electric signal through the O/E unit.

Figure 4A:
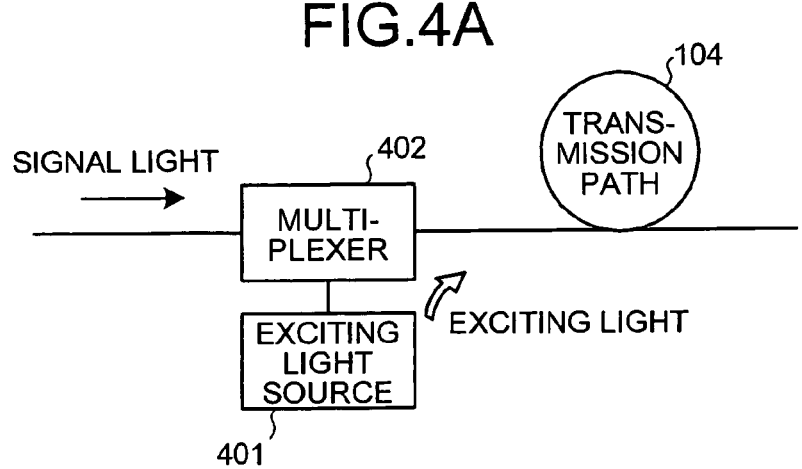
FIGS. 4A to 4C are diagrams of types of pumping performed in Raman amplification.
Figure 4B:
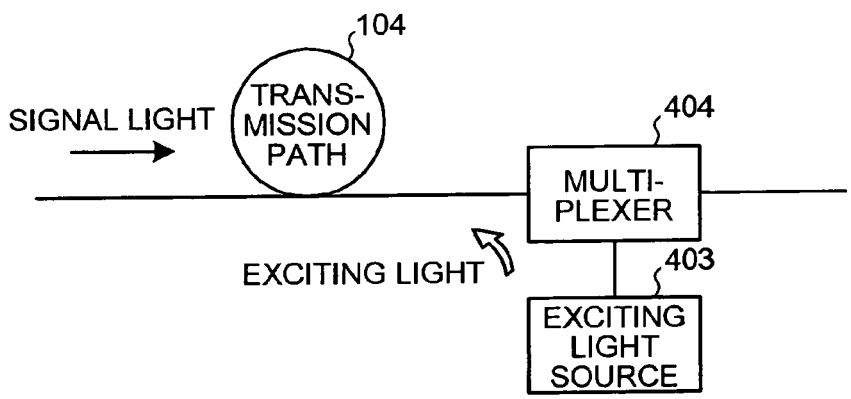
Figure 4C:
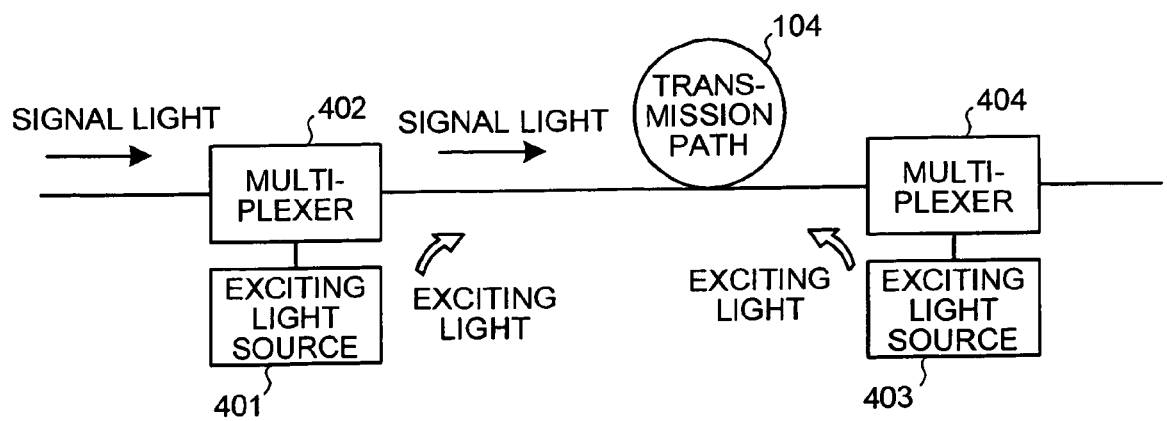

FIGS. 4A to 4C are diagrams of types of pumping performed by Raman amplification. The Raman amplification is classified in three types depending on directions of pumping lights for a signal light. As shown in FIG. 4A, a method which inputs a pumping light from a pumping light source 401 is input through a multiplexer 402 such that the pumping light has the same direction as that of the signal light on a front side (own optical terminal apparatus 100 side) of the transmission path 104 is called forward pumping. In the forward pumping, an optical SNR (signal-to-noise ratio) of a signal light can be kept high.

As shown in FIG. 4B, a configuration in which a pumping light from a pumping light source 403 is input through a multiplexer 404 such that the pumping light has a direction opposing the direction of a signal light on the rear side (other optical terminal apparatus side) of the transmission path 104 is called backward pumping. In the backward pumping, a gain is not easily saturated in comparison with the forward pumping, and an output can be increased.

As shown in FIG. 4C, a method which arranges the pumping light sources 401 and 403 on the front and rear sides of the transmission path 104, respectively and inputs pumping lights from both the directions of the signal light through the multiplexers 402 and 404 is called as bidirectional pumping. The bidirectional pumping can achieve not only a high output, but also adjustment of a balance to reflect effects obtained by the pumping methods in the signal light by increasing and decreasing an output of two pumping lights in forward pumping and backward pumping.

The optical terminal apparatus 100 shown in FIG. 1 has a configuration in which a pumping light source unit for Raman amplification is connected to an optical multiplexer/demultiplexer. Since any one of a signal light unit and a pumping light source unit can be used as a unit to be mounted, only the signal light unit is connected when a transmission distance of a signal light need not be extended to use the optical terminal apparatus 100 for transmission, or the pumping light source unit is connected to use the optical terminal apparatus 100 for amplification of a specific signal light. An arrangement of light sources and units (signal light and pumping light) depending on an object such as an exciting method or a transmission distance will be exemplified.

Figure 5:
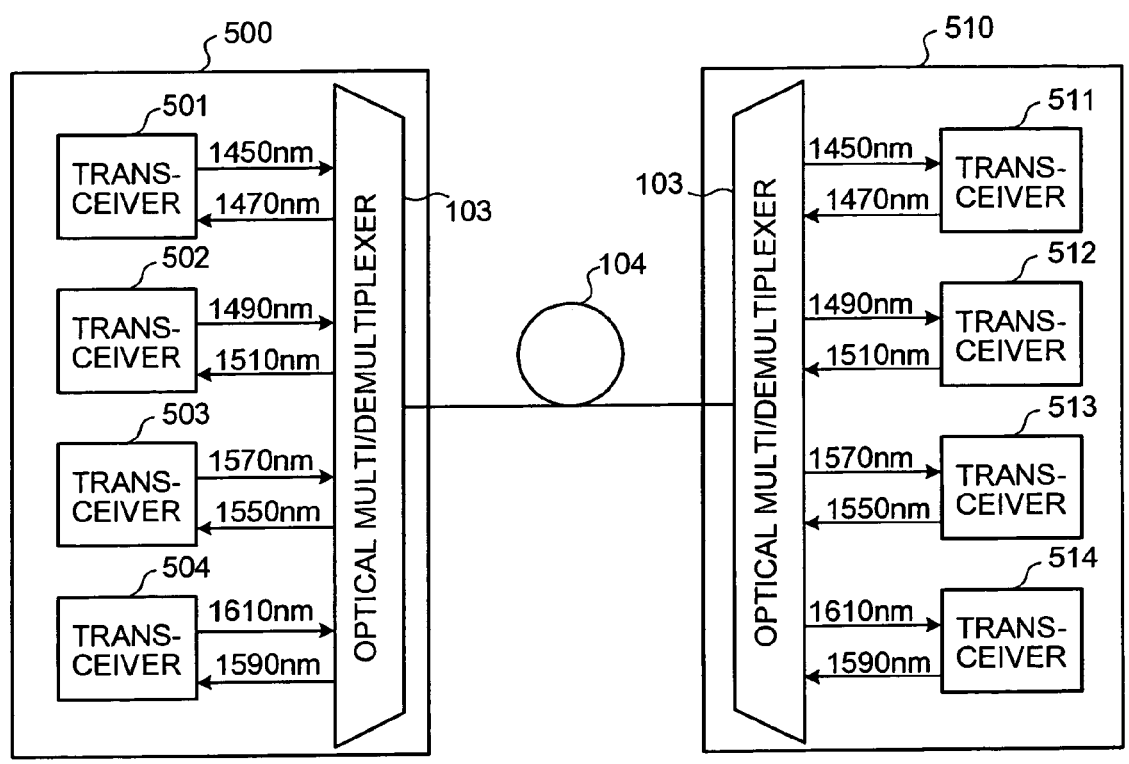
FIG. 5 is a diagram of for illustrating a configuration in which a pumping light source unit for the Raman amplification is not connected.

FIG. 5 is a diagram of a configuration in which no Raman amplification pumping light source. An optical terminal apparatus 500 and an optical terminal apparatus 510 include 4 transceivers constituted by two signal light units for transmission and two signal light units for reception.

Arrangements of wavelengths of light sources of the transceivers and types of signal lights will be determined as follows:

Transceivers arranged in the optical terminal apparatus 500:
 transceiver 501: 1450 nm (for transmission), 1470 nm (for reception)
 transceiver 502: 1490 nm (for transmission), 1510 nm (for reception)
 transceiver 503: 1570 nm (for transmission), 1550 nm (for reception)
 transceiver 504: 1610 nm (for transmission), 1590 nm (for reception)

Transceivers arranged in the optical terminal apparatus 510:
 transceiver 511: 1450 nm (for transmission), 1470 nm (for reception)
 transceiver 512: 1510 nm (for transmission), 1490 nm (for reception)
 transceiver 513: 1550 nm (for transmission), 1570 nm (for reception)
 transceiver 514: 1590 nm (for transmission), 1610 nm (for reception)

With the above configuration, in the optical terminal apparatus 500 and the optical terminal apparatus 510, the transceiver 501 corresponds to the transceiver 511, the transceiver 502 corresponds to the transceiver 512, the transceiver 503 corresponds to transceiver 513, and the transceiver 504 corresponds to the transceiver 514. The optical terminal apparatus 500 and the optical terminal apparatus 510 have four bidirectional optical transmission paths each.

Figure 6:
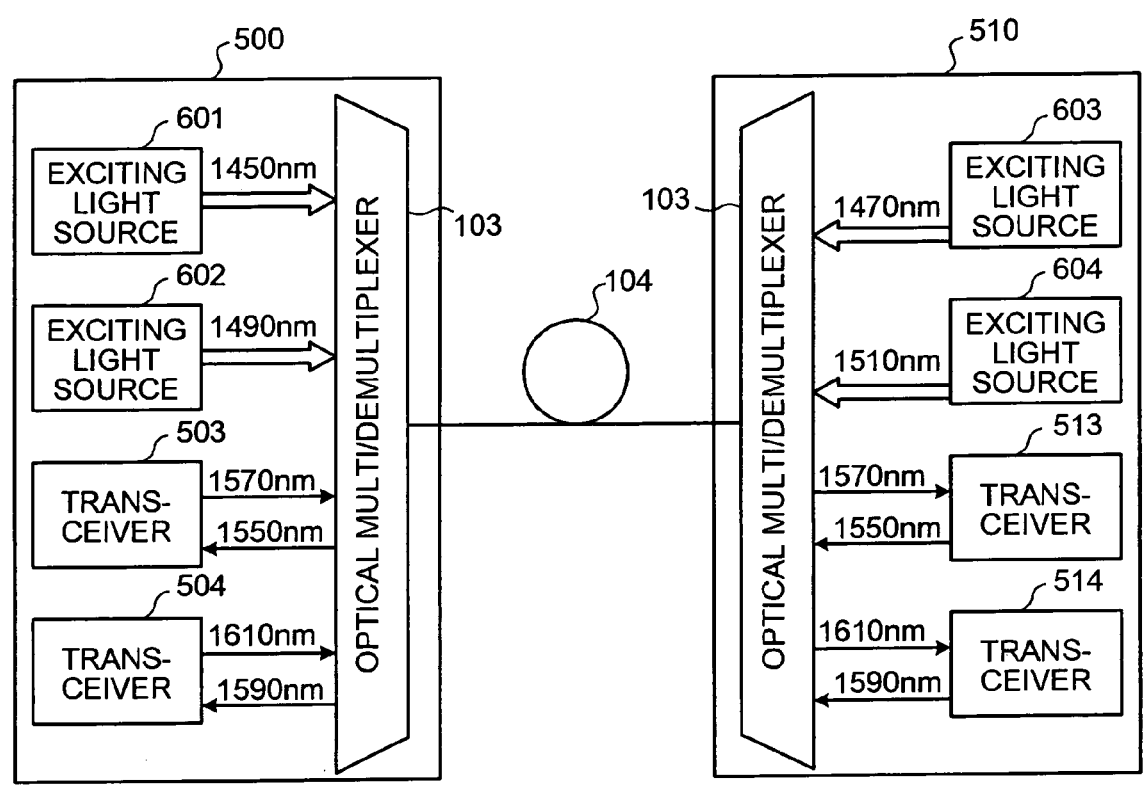
FIG. 6 is a diagram of a first connection configuration of pumping light source unit for Raman amplification.

FIG. 6 is a diagram of a first connection arrangement of a pumping light source unit for Raman amplification. The configuration in FIG. 6 is a unit arrangement obtained when Raman amplification is performed to a signal light mainly input to the optical terminal apparatus. In place of the transceiver 501 and the transceiver 502 in the optical terminal apparatus 500 shown in FIG. 5, a pumping light source 601 and a pumping light source 602 having pumping light units as light sources are arranged. In place of the transceiver 511 and the transceiver 512 in the optical terminal apparatus 510, a pumping light source 603 and a pumping light source 604 are arranged.

The above configuration is an example obtained when four slots (not shown) in which the transceivers can be arranged in each of the optical terminal apparatus 500 and the optical terminal apparatus 510. The transceiver 501 and the transceiver 502 (the transceiver 511 and the transceiver 512) are removed from the two slots, and the pumping light source 601 and the pumping light source 602 (the pumping light source 603 and the pumping light source 604) are arranged. When the optical multiplexer/demultiplexer 103 is arranged, the same number of pumping light sources can be attached to blank slots from which the transceivers are removed.

Types of light sources of the pumping light sources are determined as follows:

Exciting Light Sources Arranged in Optical Terminal Apparatus 500
 Exciting light source 601: 1450 nm
 Exciting light source 602: 1490 nm Exciting Light Sources Arranged in Optical Terminal Apparatus 510
 Exciting light source 603: 1470 nm
 Exciting light source 604: 1510 nm In the configuration shown in FIG. 6, of eight wavelengths: 1450 nm, 1470 nm, 1490 nm, 1510 nm, 1550 nm, 1570 nm, 1590 nm, and 1610 nm, the wavelengths of 1450 nm to 1510 nm are determined as the wavelengths of pumping lights to transmit the pumping lights to the transmission path 104 to make it possible to perform Raman amplification of backward pumping centered on each of the wavelengths of 1550 nm to 1610 nm.

More specifically, since Raman amplification is performed at the center of a light having a wavelength which is 100-nm longer than that of a pumping light, the pumping light source 601 (1450 nm) amplifies a transmission signal light (1550 nm) of the transceiver 513 by backward pumping. The pumping light source 602 (1490 nm) amplifies a transmission signal light (1590 nm) of the transceiver 514 by backward pumping. The pumping light source 603 (1470 nm) amplifies a transmission signal light (1570 nm) of the transceiver 503 by backward pumping. The pumping light source 604 (1510 nm) amplifies a transmission signal light (1610 nm) of the transceiver 504 by backward pumping.

Therefore, the optical terminal apparatus 500 and the optical terminal apparatus 510 are arranged as transceivers in which the transceiver 503 and the transceiver 504 correspond to the transceiver 513 the transceiver 514, respectively. More specifically, each of the optical terminal apparatus 500 and the optical terminal apparatus 510 has a configuration including two bidirectional optical transmission paths which can amplify transmission signal lights of the corresponding transceivers.

In this case, the wavelengths of 1450 nm, 1470 nm, 1490 nm, and 1510 nm of lights output from the pumping light source units are wavelengths used in a CWDM optical transmission system. For this reason, the lights are transmitted to the transmission path 104 by the optical multiplexer/demultiplexer 103 and can function as pumping lights.

FIG. 7 is a diagram of a second connection configuration of pumping light source unit for Raman amplification. The configuration in FIG. 7 indicates an arrangement of light sources and units when Raman amplification is performed by forward pumping. In place of the transceiver 501, the transceiver 502 the transceiver 511, and the transceiver 512 shown in FIG. 5, the pumping light source 601 to the pumping light source 604 having pumping light units as light sources are arranged.

Types of light sources of the pumping light sources are determined as follows:

Exciting Light Sources Arranged in Optical Terminal Apparatus 500

Exciting light source 603: 1470 nm
Exciting light source 604: 1510 nm

Exciting Light Sources Arranged in Optical Terminal Apparatus 510

Exciting light source 601: 1450 nm
Exciting light source 602: 1490 nm

In the configuration shown in FIG. 7, of eight wavelengths: 1450 nm, 1470 nm, 1490 nm, 1510 nm, 1550 nm, 1570 nm, 1590 nm, and 1610 nm, the wavelengths of 1450 nm to 1510 nm are determined as the wavelengths of pumping lights to transmit the pumping lights to the transmission path 104 to make it possible to perform Raman amplification of forward pumping centered on each of the wavelengths of 1550 nm to 1610 nm.

More specifically, in the configuration shown in FIG. 7, unlike the configuration in FIG. 6, a traveling direction of a signal light is equal to that of a pumping light subjected to Raman amplification (having a wavelength 100-nm shorter than that of the signal light). The pumping light source 603 (1470 nm) amplifies a transmission signal light (1570 nm) of the transceiver 503 by forward pumping. The pumping light source 604 (1510 nm) amplifies a transmission signal light (1610 nm) of the transceiver 504 by forward pumping. The pumping light source 601 (1450 nm) amplifies a transmission signal light (1550 nm) of the transceiver 513 by forward pumping. The pumping light source 602 (1490 nm) amplifies a transmission signal light (1590 nm) of the transceiver 514 by forward pumping. Therefore, each of the transceivers in the optical terminal apparatus 500 and the optical terminal apparatus 510 has the same correspondence as that in FIG. 6 and has two bidirectional optical transmission paths which can amplify transmission signal lights of the transceivers themselves.

In this case, the wavelengths 1450 nm, 1470 nm, 1490 nm, and 1510 nm of lights output from the pumping light source units are wavelengths used in a CWDM optical transmission system. For this reason, the lights are transmitted to the transmission path 104 by the optical multiplexer/demultiplexer 103 and can function as pumping lights.

FIG. 8 is a diagram of a third connection configuration of pumping light source unit for Raman amplification. The configuration in FIG. 8 indicates an arrangement of light sources and units when Raman amplification is performed by bidirectional pumping. In place of the transceiver 501, the transceiver 502 the transceiver 511, and the transceiver 512 shown in FIG. 5, a pumping light source 801 and a pumping light source 802 having pumping light units as light sources are arranged. In each of the pumping light source 801 and the pumping light source 802, two pumping light units are arranged for one pumping light source.

Types of light sources of the pumping light sources are determined as follows:

Exciting light source 801: 1450 nm, 1470 nm
Exciting light source 802: 1490 nm, 1510 nm In the configuration shown in FIG. 8, of eight wavelengths: 1450 nm, 1470 nm, 1490 nm, 1510 nm, 1550 nm, 1570 nm, 1590 nm, and 1610 nm, the wavelengths of 1450 nm to 1510 nm are determined as the wavelengths of pumping lights to transmit the pumping lights to the transmission path 104 to make it possible to perform Raman amplification of forward pumping centered on each of the wavelengths of 1550 nm to 1610 nm.

More specifically, as shown in FIG. 8, two pumping lights in the same direction and opposing directions with respect to one signal light are used, and the signal light is amplified by bidirectional pumping. The pumping light source 801 (1450 nm and 1470 nm) amplifies a transmission signal light (1570 nm) of the transceiver 503 and a transmission signal light (1550 nm) of the transceiver 513 by bidirectional pumping. The pumping light source 802 (1490 nm and 1510 nm) amplifies a transmission signal light (1610 nm) of the transceiver 504 and a transmission signal light (1590 nm) of the transceiver 514 by bidirectional pumping. Therefore, each of the optical terminal apparatus 500 and the optical terminal apparatus 510 has two bidirectional optical transmission paths which can obtain amplification gains of signal lights that are larger than amplification gains obtained in at least one of the forward pumping and the backward pumping and which can extend the transmission distances.

In this case, the wavelengths of 1450 nm, 1470 nm, 1490 nm, and 1510 nm of lights output from the pumping light source units are wavelengths used in a CWDM optical transmission system. For this reason, the lights are transmitted to the transmission path 104 by the optical multiplexer/demultiplexer 103 and can function as pumping lights.

Figure 9A:
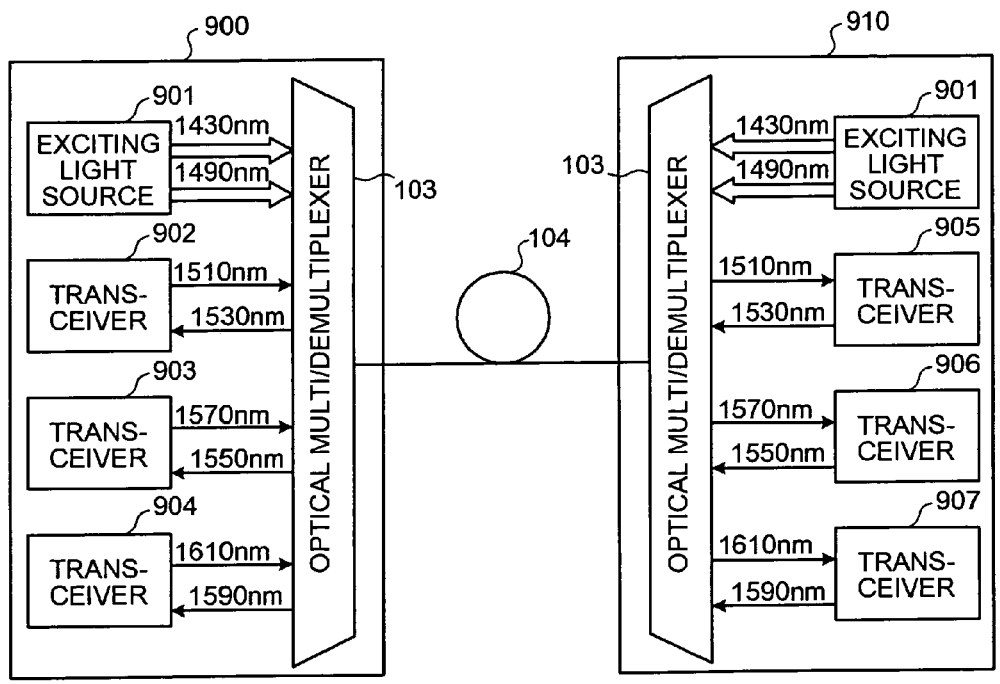
FIG. 9A is a fourth connection configuration of pumping light source unit for Raman amplification.
Figure 9B:
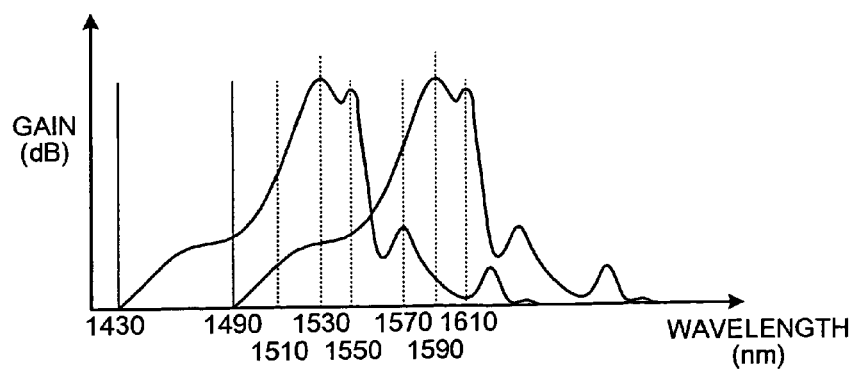
FIG. 9B is a graph of a relationship between a wavelength and a gain of a pumping light in Raman amplification.

FIG. 9A is a diagram of a fourth connection configuration of a pumping light source unit for Raman amplification. FIG. 9A shows an arrangement of light sources and units when Raman amplification by pumping light source units reduced in number. FIG. 9B is a graph a relationship between a wavelength and a gain of a pumping light in Raman amplification. As described above, Raman amplification is performed at the center of a wavelength which is 100-nm longer than that of a pumping light. Therefore, as described in the arrangements in the optical terminal apparatus 500 and the optical terminal apparatus 510, even though pumping lights and the signal lights are not used in one-to-one correspondence, when the wavelengths of a plurality of signal lights to be amplified fall within a Raman amplification band, the number of pumping lights output from the pumping light sources can be reduced by devising the types and arrangement of the light sources.

An optical terminal apparatus 900 and an optical terminal apparatus 910 shown in FIG. 9A use eight light sources of 1430 nm, 1490 nm, 1510 nm, 1530 nm, 1550 nm, 1570 nm, 1590 nm, and 1610 nm used in a CWDM optical transmission system from a band of wavelengths at which optical losses are minimum in transmission shown in the graph in FIG. 2.

Types of pumping light sources and light sources of the transceivers will be determined as follows:
pumping light source 901: 1430 nm and 1490 nm Transceivers arranged in the optical terminal apparatus 900:
transceiver 902: 1510 nm (for transmission), 1530 nm (for reception)
transceiver 903: 1570 nm (for transmission), 1550 nm (for reception)
transceiver 904: 1610 nm (for transmission), 1590 nm (for reception)

Transceivers arranged in the optical terminal apparatus 910:
transceiver 905: 1530 nm (for transmission), 1510 nm (for reception)
transceiver 906: 1550 nm (for transmission), 1570 nm (for reception)
transceiver 907: 1590 nm (for transmission), 1610 nm (for reception)

In the configuration shown in FIG. 9A, lights having two wavelengths of 1430 nm and 1490 nm are used as pumping lights to transmit the pumping lights to the transmission path 104, so that Raman amplification using bidirectional pumping can be performed at the center of each of the wavelengths of 1510 nm to 1610 nm.

More specifically, gains depending on wavelength differences between the signal light and two pumping lights having wavelengths of 1430 nm and 1490 nm and output from the pumping light source 901 can be obtained. A gain actually reflected in the signal light is a gain obtained by superposing the gains of the two pumping lights. The pumping light source 901 (1430 nm, 1490 nm) can amplify a transmission signal light (1510 nm) of the transceiver 902, a transmission signal light (1570 nm) of the transceiver 903, a transmission signal light (1610 nm) of the transceiver 904, a transmission signal light (1530 nm) of the transceiver 905, transmission signal light (1550 nm) of the transceiver 906, and a transmission signal light (1590 nm) of the transceiver 907 by using bidirectional pumping. Therefore, in each of the optical terminal apparatus 900 and the optical terminal apparatus 910, the transceiver 902, the transceiver 903, and the transceiver 904 correspond to the transceiver 905, the transceiver 906, and the transceiver 907, respectively, and three bidirectional transmission paths which can amplify signal lights of the transceivers are arranged.

In this case, since the two wavelengths 1430 nm and 1490 nm of the lights output from the pumping light source units are wavelengths which can be used in a CWDM optical transmission system, the lights are transmitted to the transmission path 104 by the optical multiplexer/demultiplexer 103 and can function as pumping lights. In the above configurations, the two pumping lights having the wavelengths of 1430 nm and 1490 nm are used. However, the wavelengths of the pumping lights and the number of wavelengths can be arbitrarily changed in accordance with the wavelengths of signal lights used in the CWDM optical transmission system.

FIG. 10 is a diagram of an optical terminal apparatus on which amplification optical fiber is mounted. An optical terminal apparatus 1000 and an optical terminal apparatus 1010 have a configuration in which an amplification optical fiber 1001 is mounted to connect the optical multiplexer/demultiplexers 103 to the transmission path 104 in the optical terminal apparatus 500 and the optical terminal apparatus 510 shown in FIGS. 5 to 8 and the optical terminal apparatus 900 and the optical terminal apparatus 910 shown in FIG. 9A. As the amplification optical fiber 1001, an optical fiber which can amplify a signal wavelength band to be used may be used. for example, an erbium-doped optical fiber (EDF) can also be used.

In the configuration shown in FIG. 10, of eight wavelengths: 1450 nm, 1470 nm, 1490 nm, 1510 nm, 1550 nm, 1570 nm, 1590 nm, and 1610 nm, the wavelengths of 1450 nm to 1510 nm are determined as the wavelengths of pumping lights to transmit the pumping lights to the transmission path 104 to make it possible to perform Raman amplification of backward pumping centered on each of the wavelengths of 1550 nm to 1610 nm.

More specifically, the pumping light source 601 (1450 nm) amplifies a transmission signal light (1550 nm) of the transceiver 513 by backward pumping. The pumping light source 602 (1490 nm) amplifies a transmission signal light (1590 nm) of the transceiver 514 by backward pumping. The pumping light source 603 (1470 nm) amplifies a transmission signal light (1570 nm) of the transceiver 503 by backward pumping. The pumping light source 604 (1510 nm) amplifies a transmission signal light (1610 nm) of the transceiver 504 by backward pumping. Therefore, in the configuration, the transceiver 503 and the transceiver 504 correspond to the transceiver 513 the transceiver 514, respectively, and two bidirectional optical transmission paths which can amplify signal lights are arranged.

In this case, the wavelengths of 1450 nm, 1470 nm, 1490 nm, and 1510 nm of lights output from the pumping light source units are wavelengths used in a CWDM optical transmission system. For this reason, the lights are transmitted to the transmission path 104 by the optical multiplexer/demultiplexer 103 and can function as pumping lights.

The types and the arrangement of the pumping light sources and the light sources of the transceivers are equal to those obtained when the backward pumping shown in FIG. 6 is performed. However, the types and the arrangement can also be applied to all the configurations shown in FIG. 5 to FIG. 9A.

FIG. 11 is a diagram of an optical terminal apparatus obtained when pumping light source control is performed. An optical terminal apparatus 1100 and an optical terminal apparatus 1110 have a configuration which includes, in addition to light sources of the same types as those in the optical terminal apparatus 500 and the optical terminal apparatus 510 shown in FIG. 7 and the same unit arrangements as those of the optical terminal apparatus 500 and the optical terminal apparatus 510, a control unit 1101, a control signal light units 1102a (in the optical terminal apparatus 500) and 1102b (in the optical terminal apparatus 510).

In the configuration shown in FIG. 11, of eight wavelengths: 1450 nm, 1470 nm, 1490 nm, 1510 nm, 1550 nm, 1570 nm, 1590 nm, and 1610 nm, the wavelengths of 1450 nm to 1510 nm are determined as the wavelengths of pumping lights to transmit the pumping lights to the transmission path 104 to make it possible to perform Raman amplification of backward pumping centered on each of the wavelengths of 1550 nm to 1610 nm.

More specifically, the pumping light source 603 (1470 nm) amplifies a transmission signal light (1570 nm) of the transceiver 503 by forward pumping. The pumping light source 604 (1510 nm) amplifies a transmission signal light (1610 nm) of the transceiver 504 by forward pumping. The pumping light source 601 (1450 nm) amplifies a transmission signal light (1550 nm) of the transceiver 513 by forward pumping. The pumping light source 602 (1490 nm) amplifies a transmission signal light (1590 nm) of the transceiver 514 by forward pumping. Therefore, in the configuration, the transceiver 503 and the transceiver 504 correspond to the transceiver 513 the transceiver 514, respectively, and two bidirectional optical transmission paths which can amplify signal lights are arranged. The types and the arrangement of the pumping light sources and the light sources of the transceivers are equal to those obtained when the backward pumping shown in FIG. 7 is performed. However, the types and the arrangement can also be applied to all the configurations shown in FIG. 5 to FIG. 10.

In this case, the wavelengths of 1450 nm, 1470 nm, 1490 nm, and 1510 nm of lights output from the pumping light source units are wavelengths used in a CWDM optical transmission system. For this reason, the lights are transmitted to the transmission path 104 by the optical multiplexer/demultiplexer 103 and can function as pumping lights.

The control signal light unit 1102a in the optical terminal apparatus 1100 receives a monitor control signal from a monitor control signal separation filter 1104 corresponding to the WDM coupler 9 (103i) in the optical multiplexer/demultiplexer 103 shown in FIG. 3A to make it possible to acquire reception level information of signal lights transmitted from the transceiver 513 and the transceiver 514 in the optical terminal apparatus 1110. As a wavelength band of the light of the monitor control signal, a wavelength band different from the wavelength band of a main signal light, i.e., 1300-nm band is used. The monitor control signal separation filter 1104 demultiplexes the light of the wavelength. An optical multiplexer/demultiplexer 1103 as a function corresponding to the WDM coupler 1 to the WDM coupler 8 (103a to 103h) shown in FIG. 3A. In response to a designation from the control signal light unit 1102a, the control unit 1101 controls the transmission levels of the corresponding transceivers 503 and 504 on the basis of the level information to make it possible to control the reception levels of the signal lights of the wavelengths received by the transceivers 513 and 514 such that the reception levels are equal to each other.

Similarly, the control signal light units 1102a and 1102b in the optical terminal apparatus 1110 can acquire reception level information of the signal lights transmitted by the transceiver 503 and the transceiver 504 in the optical terminal apparatus 1100. In response to a designation from the control signal light unit 1102b, the control unit 1101 controls the transmission levels of the corresponding transceivers 513 and 514 on the basis of the reception level information to make it possible to control the reception level of the signal lights of the wavelengths received by the transceivers 503 and 504 such that the reception levels are equal to each other.

The reception level of the signal light can be performed by adjusting an output level (output power) of a pumping light from the pumping light source which transmits a light having a wavelength corresponding to the wavelength of the signal light transmitted by the transceiver. The output level of the pumping light transmitted from the pumping light source can also be adjusted by controlling a temperature of the pumping light source. The temperature control of the pumping light source makes the wavelength of the pumping light variable to make it possible to change a gain characteristic of each wavelength. In this manner, the reception level of the signal light of each wavelength received by the transceiver can be made constant.

As described above, according to the optical terminal apparatus of the first embodiment, the optical terminal apparatus having the same configuration as that of a conventional optical terminal apparatus is used to select types of light sources using the principle of Raman amplification and to arrange units for signal lights and pumping lights, so that the signal lights can be amplified without arranging a new large-scale arrangement. The numbers of transceivers and pumping light sources included in the optical terminal apparatus can be mutually adjusted. The units of transceivers and the units of pumping light sources can be replaced with a predetermined number of slots and fixed, and signal lights having corresponding predetermined wavelengths can be amplified.

In the optical terminal apparatus which performs multiplexing by the DWDM explained in the description of the conventional technique, an inter-wavelength interval of light sources is generally short, i.e., about 0.8 nm, and even a wavelength difference between a light source having the shortest wavelength and a light source having the longest wavelength cannot be easily set at 100 nm. Unlike the first embodiment, the characteristic feature of Raman amplification cannot be used. Even though a light source for pumping is arranged in the apparatus, since an optical multiplexer/demultiplexer used in CWDM has a wide wavelength path band, the pumping light can input to the same port as that of a signal light (the same WDM coupler is used). However, the optical multiplexer/demultiplexer used in DWDM cannot be used because the pass band of the optical multiplexer/demultiplexer is set at a narrow band. Therefore, a new optical multiplexer/demultiplexer for pumping must be arranged, and the optical terminal apparatus increases in size.

With respect to this point, according to the present invention, multiplexing by CWDM is assumed. For this reason, in the first embodiment, light source of a short wavelength in which a transmission loss such as attenuation caused by OH (hydroxyl group) absorption or the like of an optical fiber is relatively large is used as a pumping light source unless amplification is performed (example shown in FIG. 5). In this manner, a CWDM-specialized optical terminal apparatus which can compensate for drawbacks of the CWDM and can flexibly cope with demands of a user such as a degree of extension of a transmission distance and the number of channels can be obtained by changing only types of light sources and an arrangement of units.

According to the second embodiment, an optical terminal apparatus which includes a unit for an EDFA therein to amplify a signal light will be described below. The EDFA is an optical amplifier in which a pumping light is input to an optical fiber having a core section doped with erbium (Er) which is a rare earth to cause induced emission of a light of a wavelength in a 1550-nm band so that a signal light transmitted to an EDF section is amplified. Therefore, as a signal light to be amplified, a light having a wavelength of 1530 nm to 1590 nm selected from wavelengths at which wavelength dependence losses are small in FIG. 2 is used in consideration of an amplification gain band of the EDFA. On the basis of the energy level of an erbium ion ($Er^{3+}$), a light having a wavelength of 1480 nm or 980 nm is used as a pumping light to cause inductive emission.

Figure 12:
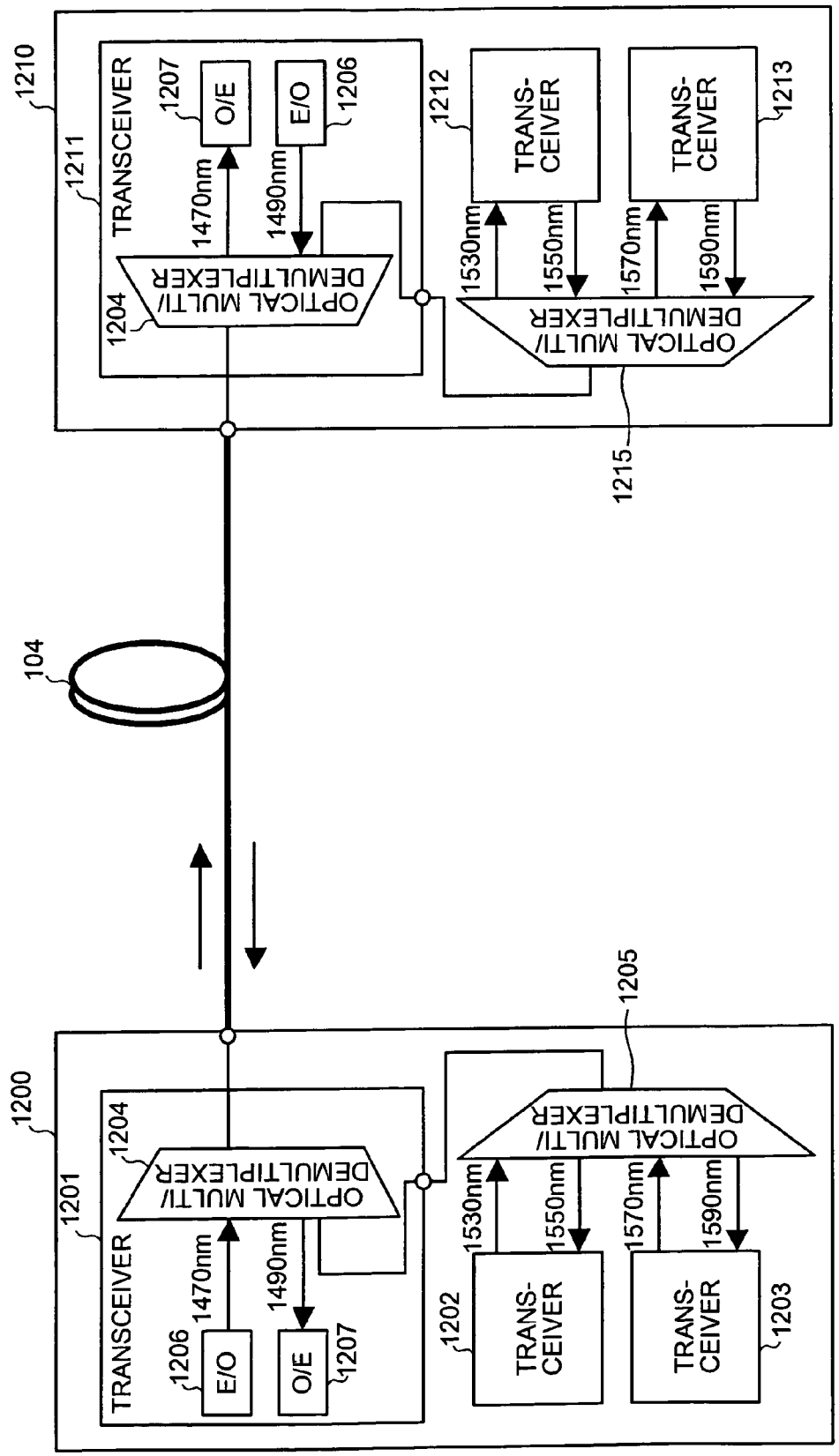
FIG. 12 is a diagram of a configuration of an optical terminal apparatus according to a second embodiment.

FIG. 12 is a diagram of a configuration of an optical terminal apparatus according to the second embodiment. An optical terminal apparatus 1200 includes a transceiver 1201 to a transceiver 1203. The transceiver 1201 uses a built-in optical multiplexer/demultiplexer 1204 to perform optical multiplexing/demultiplexing, and the transceiver 1202 and the transceiver 1203 use an optical multiplexer/demultiplexer 1205 to perform optical multiplexing/demultiplexing. An optical terminal apparatus 1210 which exchanges signals with the optical terminal apparatus 1200 includes a transceiver 1211 to a transceiver 1213, as in the optical terminal apparatus 1200, the transceiver 1211 uses a built in optical multiplexer/demultiplexer 1204 to perform optical multiplexing/demultiplexing, and the transceiver 1212 and the transceiver 1213 use an optical multiplexer/demultiplexer 1215 to perform optical multiplexing/demultiplexing. In the transceiver 1201 to the transceiver 1203 and the transceiver 1211 to the transceiver 1213, E/O units 1206 which convert transmission signals into transmission signal lights and O/E units 1207 which convert reception signal lights into reception signals are arranged as shown in the transceiver 1201 and the transceiver 1211.

Types of light sources of the transceivers will be determined as follows:

Transceivers arranged in the optical terminal apparatus 1200:
  transceiver 1201: 1470 nm (for transmission), 1490 nm (for reception)
  transceiver 1202: 1530 nm (for transmission), 1550 nm (for reception)
  transceiver 1203: 1570 nm (for transmission), 1590 nm (for reception)

Transceivers arranged in the optical terminal apparatus 1210:
  transceiver 1211: 1490 nm (for transmission), 1470 nm (for reception)
  transceiver 1212: 1550 nm (for transmission), 1530 nm (for reception)
  transceiver 1213: 1590 nm (for transmission), 1570 nm (for reception)

The optical multiplexer/demultiplexers 1204 built in the transceiver 1201 and the transceiver 1211 are constituted by WDM couplers which multiplex/demultiplex lights having wavelengths of 1470 nm and 1490 nm. The optical multiplexer/demultiplexer 1205 is constituted by a WDM coupler which multiplexes/demultiplexes lights having wavelengths of 1530 nm, 1550 nm, 1570 nm, and 1590 nm. Therefore, the optical terminal apparatus 1200 and the optical terminal apparatus 1210 have a configuration in which the transceiver 1201, the transceiver 1202, and the transceiver 1203 correspond to the transceiver 1211, the transceiver 1212, and the transceiver 1213, respectively, and which has three bidirectional optical transmission paths.

Figure 13:
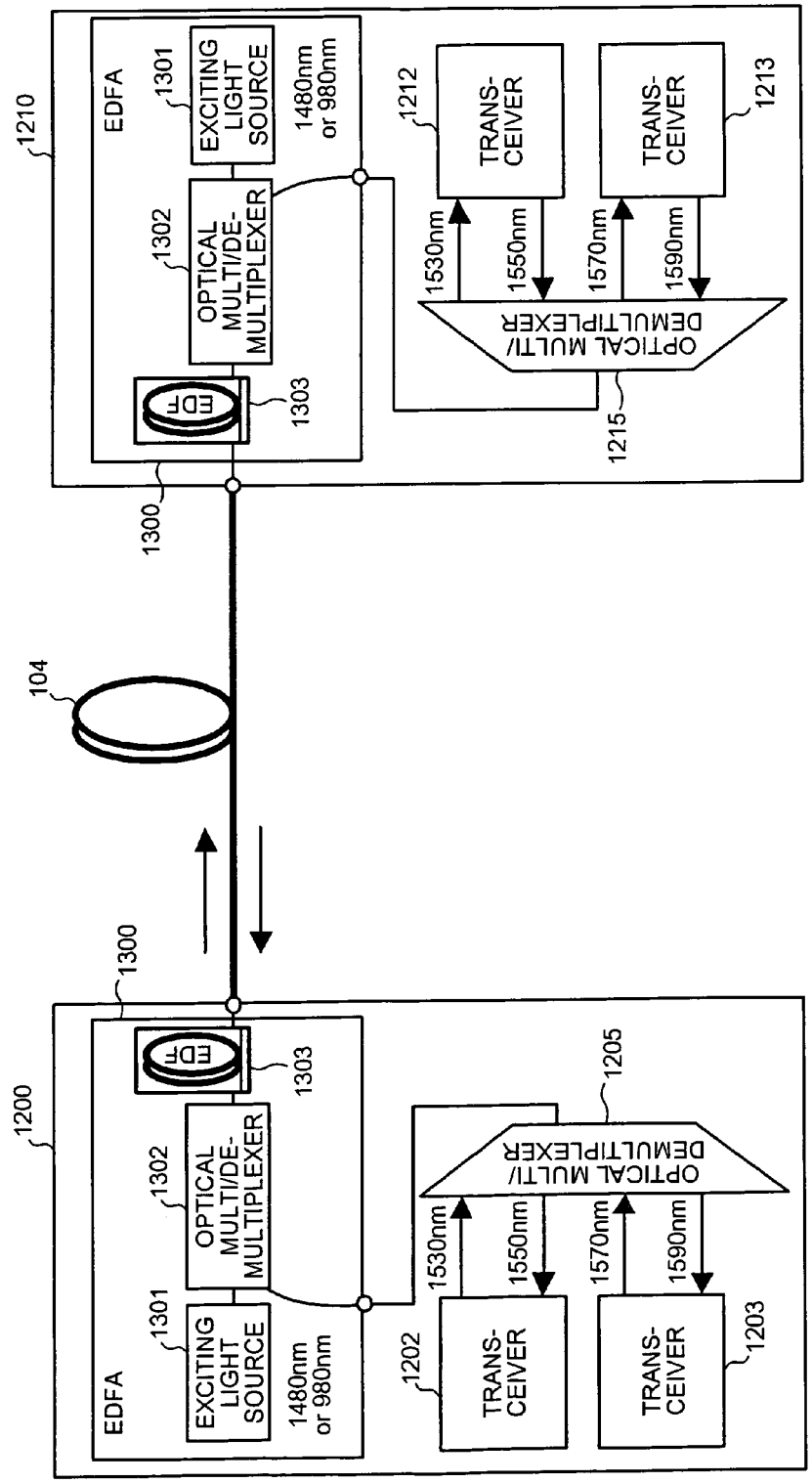
FIG. 13 is a diagram of a configuration used when a signal light is amplified by an EDFA.

FIG. 13 is a diagram of a configuration used when a signal light is amplified by an EDFA. In this configuration, an EDFA 1300 is arranged in place of the transceiver 1201 and the transceiver 1211 of the optical terminal apparatus 1200 and the optical terminal apparatus 1210.

The EDFA 1300 is constituted by a pumping light source 1301, an optical multiplexer/demultiplexer 1302, and the EDF 1303. The pumping light source 1301 inputs a light having a wavelength of 1480 nm or 980 nm to the EDF 1303 through the optical multiplexer/demultiplexer 1302. A WDM light (pumping light+signal light) obtained by multiplexing a pumping light from the pumping light source 1301 and a WDM light from the optical multiplexer/demultiplexer 1205 by the optical multiplexer/demultiplexer 1302 is input to the EDF 1303, and a signal wave is amplified and output to the transmission path 104. At the same time, a signal light of the other optical terminal apparatus input from the transmission path 104 to the EDFA 1300 is amplified. More specifically, each of the optical terminal apparatus 1200 and the optical terminal apparatus 1210 includes the EDFA 1300 to obtain three bidirectional optical transmission paths which achieve both the effects of a post-amplifier (function that amplifies a transmission signal light from the optical terminal apparatus: transmission amplifier) and a pre-amplifier (function that amplifies a signal light received from the other optical terminal apparatus: reception amplifier).

As described above, since the transceiver 1201 is used in place of the unit of the EDFA 1300, signals having wavelength except for wavelengths in a gain band (1530 nm to 1590 nm) obtained by the EDFA 1300 are set as signal lights in advance. This is because, a generally used EDFA has a gain band which is a band of lights having wavelengths of 1530 nm to 1610 nm and cannot easily amplify a light in a band ranging from 1470 nm to 1490 nm yet.

Figure 14A:
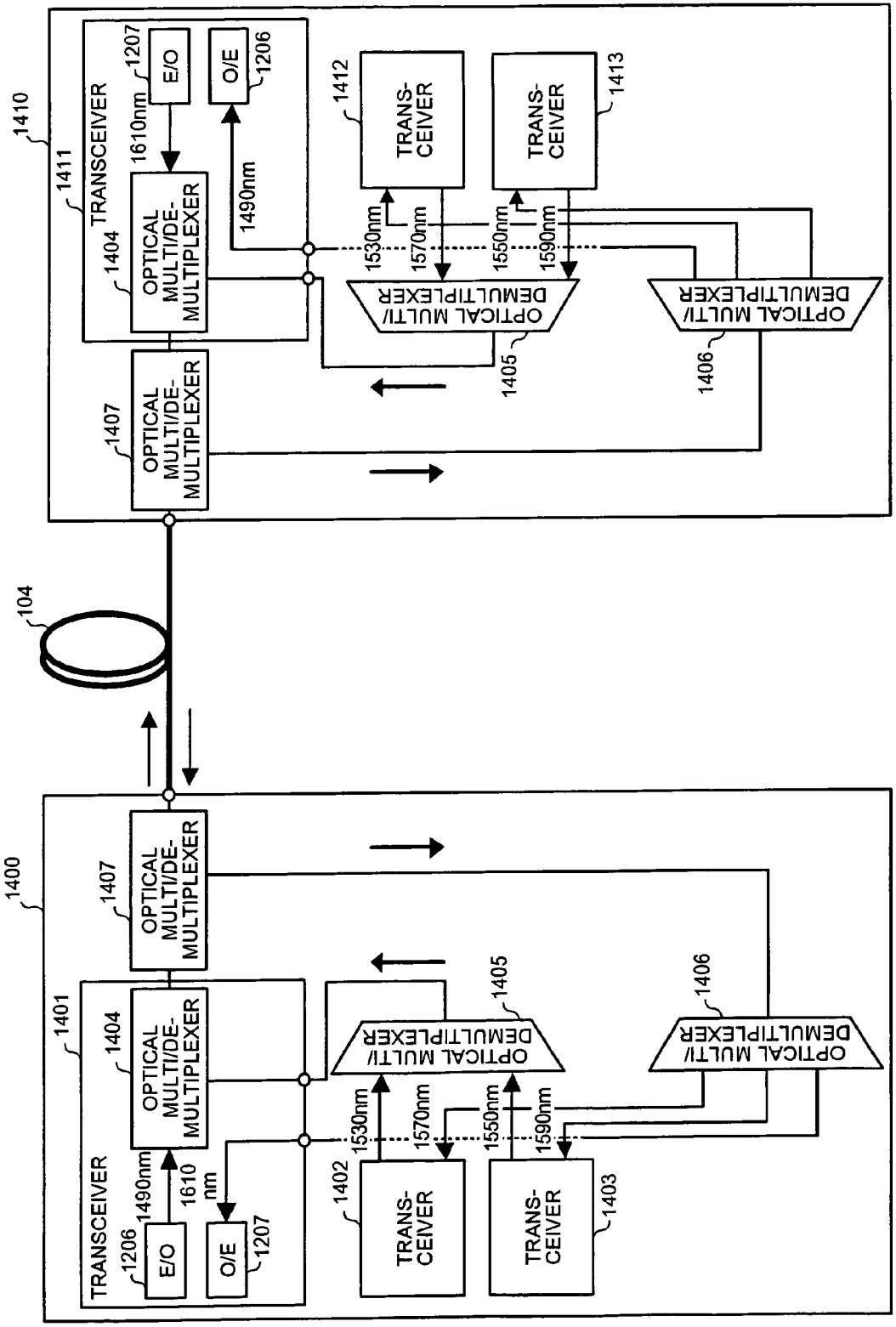
FIGS. 14A to 14C are diagrams of a configuration used when an amplification effect is independently performed.
Figure 14B:
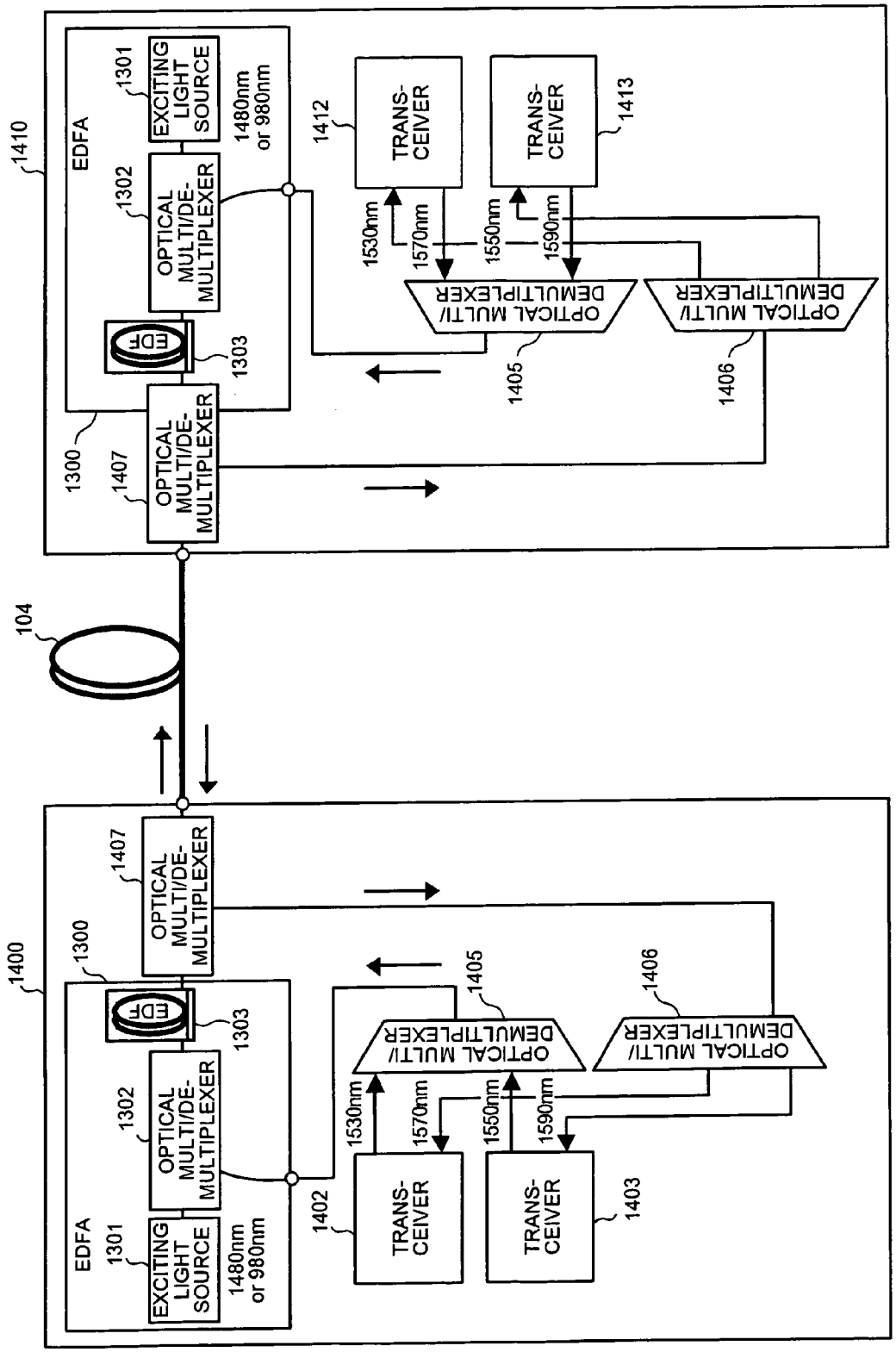
Figure 14C:
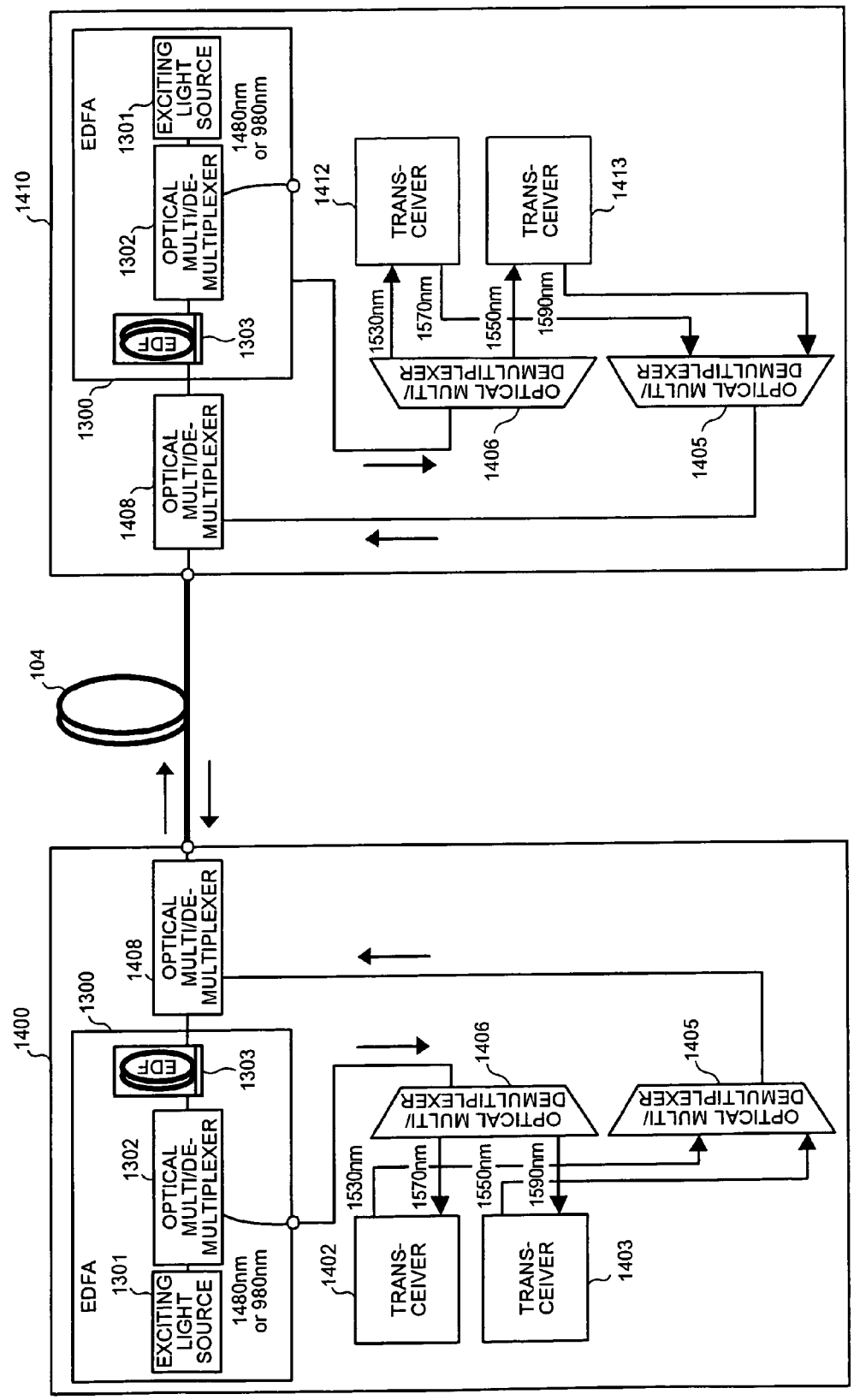

FIGS. 14A to 14C are diagram of configurations used when amplifier effects are independently obtained. A configuration of an optical terminal apparatus used when no amplification is performed will be described below by using FIG. 14A. An optical terminal apparatus 1400 includes a transceiver 1401 to a transceiver 1403. The transceiver 1401 uses a built-in optical multiplexer/demultiplexer 1404 to multiplex/demultiplex a signal light, and the transceiver 1402 and the transceiver 1403 use an optical multiplexer/demultiplexer 1405 and an optical multiplexer/demultiplexer 1406 to multiplex/demultiplex a signal light. An optical terminal apparatus 1410 which exchanges signals with the optical terminal apparatus 1400 includes a transceiver 1411 to a transceiver 1413, as in the optical terminal apparatus 1400, the transceiver 1411 uses a built in optical multiplexer/demultiplexer 1404 to multiplex/demultiplex a signal light, and the transceiver 1412 and the transceiver 1413 use the optical multiplexer/demultiplexer 1405 and the optical multiplexer/demultiplexer 1406 to multiplex/demultiplex a signal light.

Transmission signal waves from the transceivers are multiplexed in an order named: optical multiplexer/demultiplexer 1405→→optical multiplexer/demultiplexer 1404→optical multiplexer/demultiplexer 1407 to output the multiplexed wave to the transmission path 104. A signal light input from the transmission path 104 is demultiplexed in an order named: optical multiplexer/demultiplexer 1407→optical multiplexer/demultiplexer 1406, and the transceivers receive the demultiplexed lights as reception signal lights. In each of the transceiver 1401 to the transceiver 1403 and the transceiver 1411 to the transceiver 1413, as shown in the transceiver 1401 and the transceiver 1411, an E/O unit is arranged for a transmission signal light, and an O/E unit is arranged for a reception signal light.

Types of light sources of the transceivers will be determined as follows:

Transceivers arranged in the optical terminal apparatus 1400:
- transceiver 1401: 1490 nm (for transmission), 1610 nm (for reception)
- transceiver 1402: 1530 nm (for transmission), 1570 nm (for reception)
- transceiver 1403: 1550 nm (for transmission), 1590 nm (for reception)

Transceivers arranged in the optical terminal apparatus 1410:
- transceiver 1411: 1610 nm (for transmission), 1490 nm (for reception)
- transceiver 1412: 1570 nm (for transmission), 1530 nm (for reception)
- transceiver 1413: 1590 nm (for transmission), 1550 nm (for reception)

The optical multiplexer/demultiplexer 1404 built in the transceiver 1401 is constituted by a WDM coupler which multiplexes a transmission signal wave from the transceiver 1401 and transmission signal lights from the transceiver 1402 and the transceiver 1403. the optical multiplexer/demultiplexer 1405 is constituted by a WDM coupler which multiplexes transmission signal waves from the transceiver 1402 and the transceiver 1403. The optical multiplexer/demultiplexer 1406 is constituted by a WDM coupler to demultiplex reception signal lights from the transmission path 104 demultiplexed by the optical multiplexer/demultiplexer 1407 into reception signal lights for the transceiver 1401 to the transceiver 1403. As described above, the optical terminal apparatus 1400 and the optical terminal apparatus 1410 have a configuration in which the transceiver 1401, the transceiver 1402, and the transceiver 1403 correspond to the transceiver 1411, the transceiver 1412, and the transceiver 1413, respectively, and which has three bidirectional optical transmission paths.

A configuration used when an effect of a post-amplifier which amplifies a transmission signal wave is independently performed will be described below with reference to FIG. 14B. Transmission signal lights output from the transceivers by replacing the transceiver 1401 and the transceiver 1411 with the EDFAs 1300 are uniquely input to the EDFAs 1300 and amplified by the EDFs 1303, so that the effect of the post-amplifier can be obtained. Therefore, the optical terminal apparatus 1400 and the optical terminal apparatus 1410 have a configuration which includes two bidirectional optical transmission paths which can amplify transmission signal lights.

Finally, a configuration used when an effect of a pre-amplifier which amplifies a reception signal light is independently obtained will be described below with reference to FIG. 14C. As in the case in which the post-amplifier effect is independently obtained, the transceiver 1401 and the transceiver 1411 in FIG. 14A are replaced with the EDFAs 1300. Transmission signals from the transceivers are output to the transmission path 104 in an order named: optical multiplexer/demultiplexer 1405→optical multiplexer/demultiplexer 1408. A signal light input from the transmission path 104 is demultiplexed in an order named: optical multiplexer/demultiplexer 1408→EDFA 1300→optical multiplexer/demultiplexer 1406, and the demultiplexed lights are received by the transceivers as reception signal lights. The signal light from the transmission path 104 is independently input to the EDFA 1300 to make it possible to independently obtain the effect of the pre-amplifier which amplifies only a reception signal light. Therefore, the optical terminal apparatus 1400 and the optical terminal apparatus 1410 have a configuration which includes two bidirectional optical transmission paths which can amplify reception signal lights.

The optical terminal apparatus 1200 and the optical terminal apparatus 1210 shown in FIGS. 12 and 13 and the optical terminal apparatus 1400 and the optical terminal apparatus 1410 shown in FIGS. 14A to 14C are described as independent apparatuses having different specifications. However, the receivers, the optical multiplexer/demultiplexers, and the EDFAs constituting the optical terminal apparatuses are common. For this reason, when a reconfiguration of wiring can be performed in a specification, both the function of the optical terminal apparatus 1200 and the optical terminal apparatus 1210 and the function of the optical terminal apparatus 1400 and the optical terminal apparatus 1410 can also be realized by the same optical terminal apparatus.

Figure 15A:
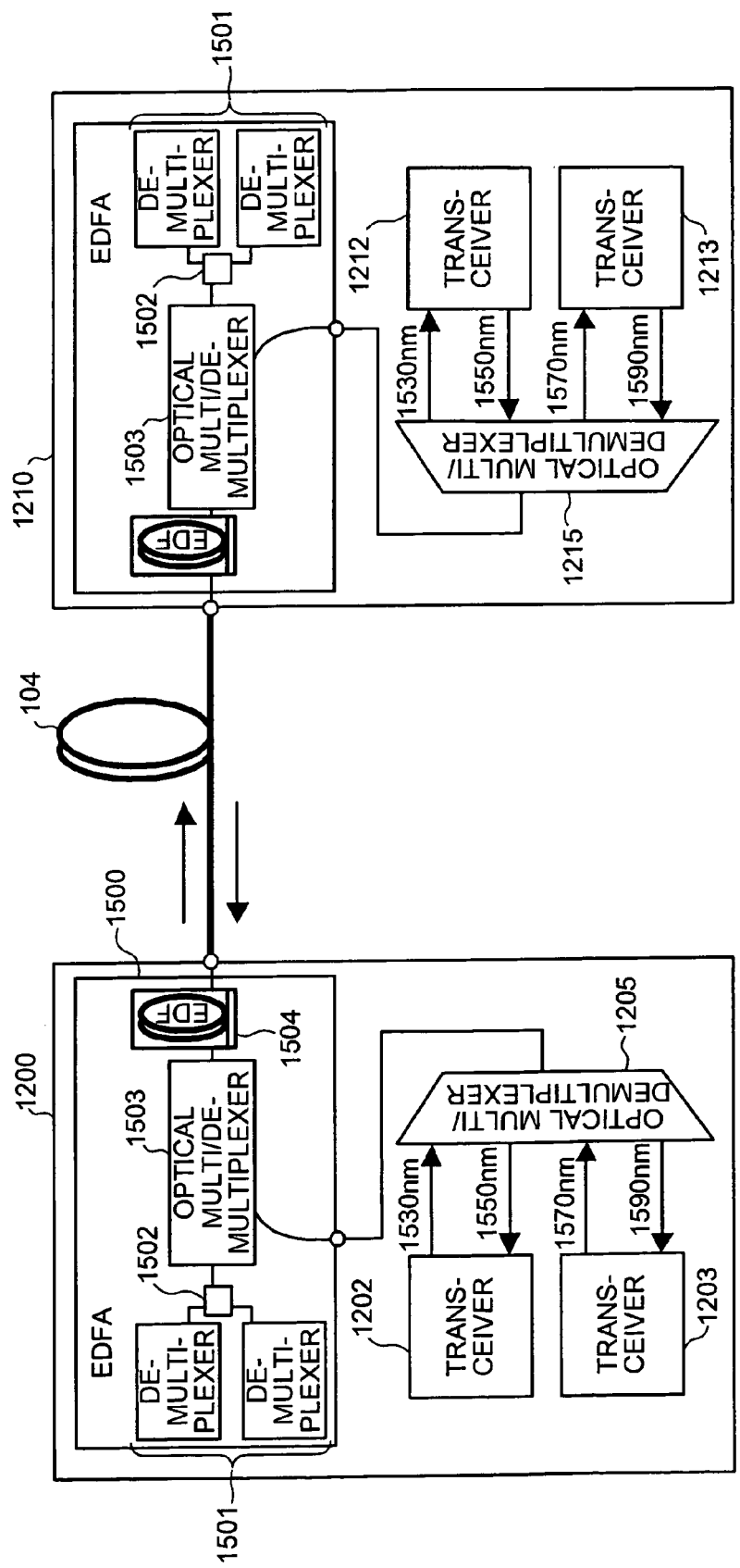
FIG. 15A is a diagram of a configuration used when a two-wavelength exciting method is performed.

FIG. 15A is a diagram of a configuration used when a two-wavelength pumping method is performed. The two-wavelength pumping method is an optical amplification method which multiplexes two pumping lights having different wavelengths or two pumping lights having equal wavelengths to amplify the lights. The optical terminal apparatus 1200 and the optical terminal apparatus 1210 have the same configurations as those of the optical terminal apparatus 1200 and the optical terminal apparatus 1210 shown in FIG. 13. As an EDFA, an amplification unit EDFA 1500 is arranged in place of the EDFA 1300 in FIG. 13 to perform the two-wavelength pumping method.

The EDFA 1500 includes a pumping light source 1501 having two pumping light sources, optical sections 1502 which multiplexes pumping lights, and an optical multiplexer/demultiplexer 1503 and an EDF 1504 which multiplex pumping lights and signal lights and demultiplex a reception signal light from the transmission path 104. Furthermore, the pumping light source 1501 and the optical sections 1502 are set as shown in the table in FIG. 15B depending on an object for amplification.

FIG. 15B is a table of settings of two wavelengths and optical sections. When the light source wavelengths of the pumping light sources are different wavelengths of 1480 nm and 1460 nm, optical multiplexer/demultiplexers constituted by WDM couplers are used as the optical sections. However, depending on the physical property of the EDF, a population inversion rate of the EDF is lower at the light having a wavelength of 1460 nm than at the light having a wavelength of 1480. As a result, a gain band in amplification performed by the light having a wavelength of 1460 nm shifts to the long wavelength side in comparison with a normal 1550-nm band. Therefore, a gain band wider than that obtained by using only a pumping light having a wavelength of 1480 nm can be obtained, and a light having a wavelength of 1610 nm can also be set in a gain band.

When the light source wavelengths of the pumping light sources are two equal wavelengths of 1480 nm or two equal wavelengths of 980 nm, as the optical sections, polarized beam splitters (PBSs) which simply superpose the equal wavelengths to perform multiplexing are used. Two wavelengths are superposed, and an exciting power increases. In addition, when the light having a wavelength of 1480 nm is used, a high gain can be obtained. When the light having a wavelength of 980 nm is used, preferable noise characteristics obtained by spontaneously emitted light can be obtained as a characteristic feature. Therefore, a configuration of wavelengths and optical sections can be selected in consideration of relationships between transmission distances and qualities of wavelengths.

Figure 16A:
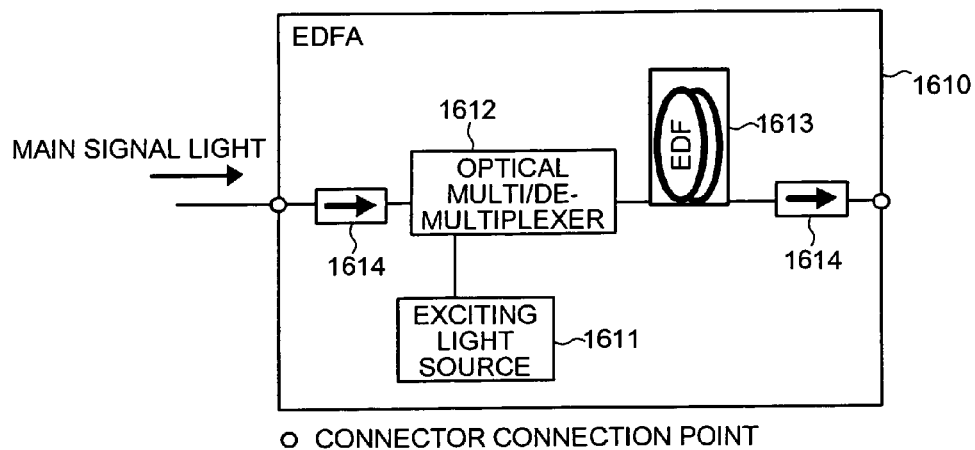
FIGS. 16A and 16B are diagrams of a basic configuration of an EDFA.
Figure 16B:
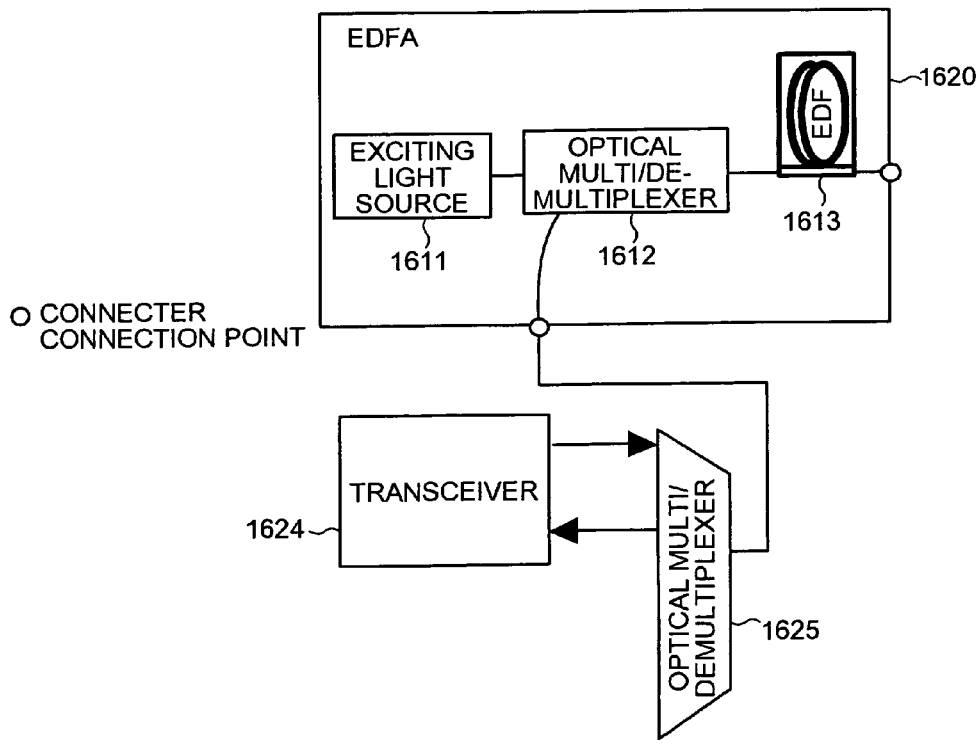

FIGS. 16A and 16B are diagrams of basic configurations of EDFAs. In general, a unit which performs optical amplification includes an optical isolator 1614 as in an EDFA 1610 shown in FIG. 16A. Since the optical isolator 1614 is arranged. For this reason, when a pumping light from a pumping light source 1611 and a signal light are multiplexed by an optical multiplexer/demultiplexer 1612, and when the multiplexed light is input to an EDF 1613, the light source module can be prevented from being damaged by the amplified signal light which reversely flows to be input to the transceiver through the optical multiplexer/demultiplexer 1612.

However, as shown in FIG. 16B, an optical isolator for protecting an optical source module is inserted into a transceiver 1624, and oscillation does not occur unless a total gain obtained by amplification in an EDFA 1620 exceeds a total reflection attenuation at a connection point with another optical section (transmission path, optical multiplexer/demultiplexer, or the like). For this reason, the optical isolator 1614 such as the EDFA 1610 is not necessary. For example, when the total reflection attenuation at a connection point between optical sections is 40 dB or more, oscillation does not occur until 2Gain (total gain in the EDFA)≧40 dB (reflection attenuation). For this reason, the optical isolator 1614 is not required when the EDFA is used at least a gain of 20 dB or less.

Figure 16C:
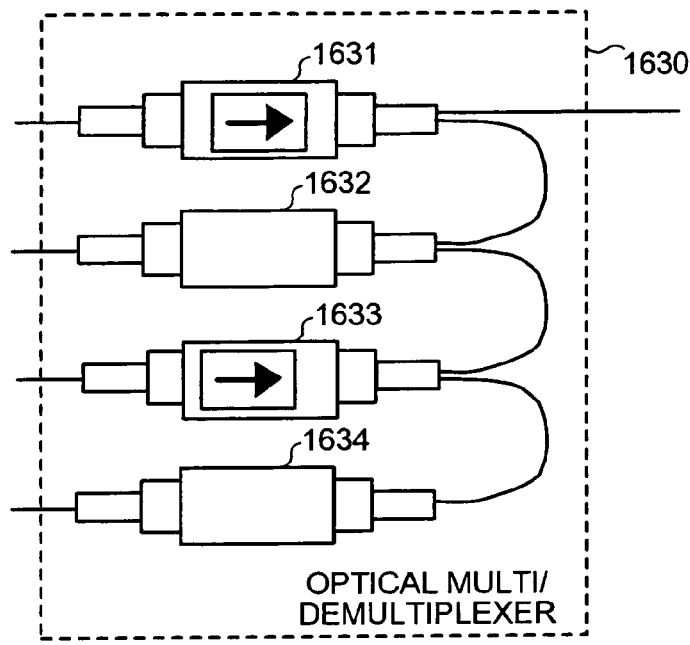
FIGS. 16C and 16D are diagrams of an internal configuration of an optical multiplexer/demultiplexer.
Figure 16D:
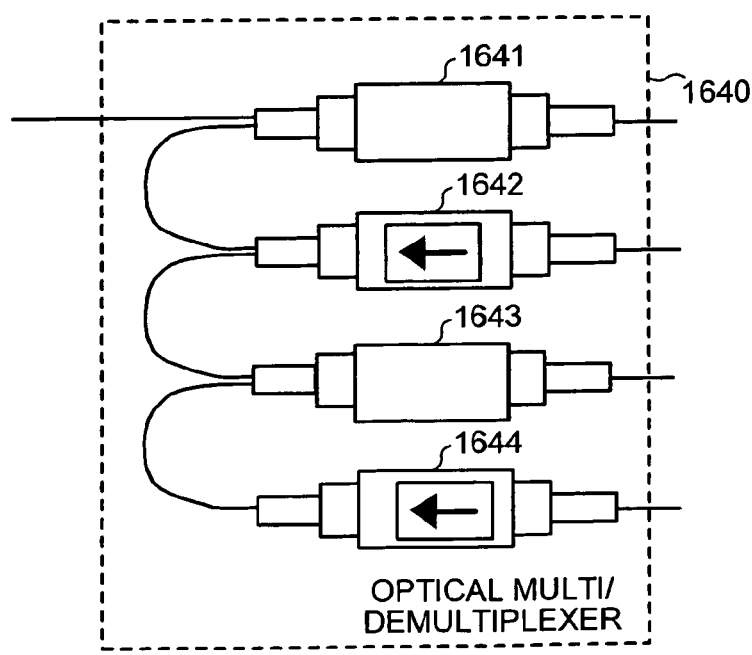

FIG. 16C and FIG. 16D are diagrams shown in internal configurations of optical multiplexer/demultiplexers. Even though an optical isolator is necessary depending on a relationship between a gain and a reflection attenuation of the EDFA, if no optical isolator is not arranged in a light source unit of a transceiver, as shown in FIG. 16C and FIG. 16D, isolators are included in WDM couplers 1631 to 1634 and 1641 to 1644 constituting optical multiplexer/demultiplexers 1630 and 1640 to prevent the light source module from being damaged.

The optical terminal apparatus 1200 and the optical terminal apparatus 1210 shown in FIG. 13 will be exemplified. The optical multiplexer/demultiplexer 1205 in the optical terminal apparatus 1200 corresponds to the optical multiplexer/demultiplexer 1630 in FIG. 16C, and the optical multiplexer/demultiplexer 1215 in the optical terminal apparatus 1210 corresponds to the optical multiplexer/demultiplexer 1640 in FIG. 16D. Optical isolators are arranged in the WDM coupler 1631 and the WDM coupler 1633 to multiplex transmission signal lights of the optical terminal apparatus 1200, and optical isolators are arranged in the WDM coupler 1642 and the WDM coupler 1644 to multiplex transmission signal lights of the optical terminal apparatus 1210.

As described above, it can be determined by a relationship between a gain of the EDFA and a reflection attenuation of the optical sections whether an optical isolator is used. Even though an optical isolator must be arranged, a position where the optical isolator can be flexibly determined depending on design and cost of an optical terminal apparatus.

Figure 17A:
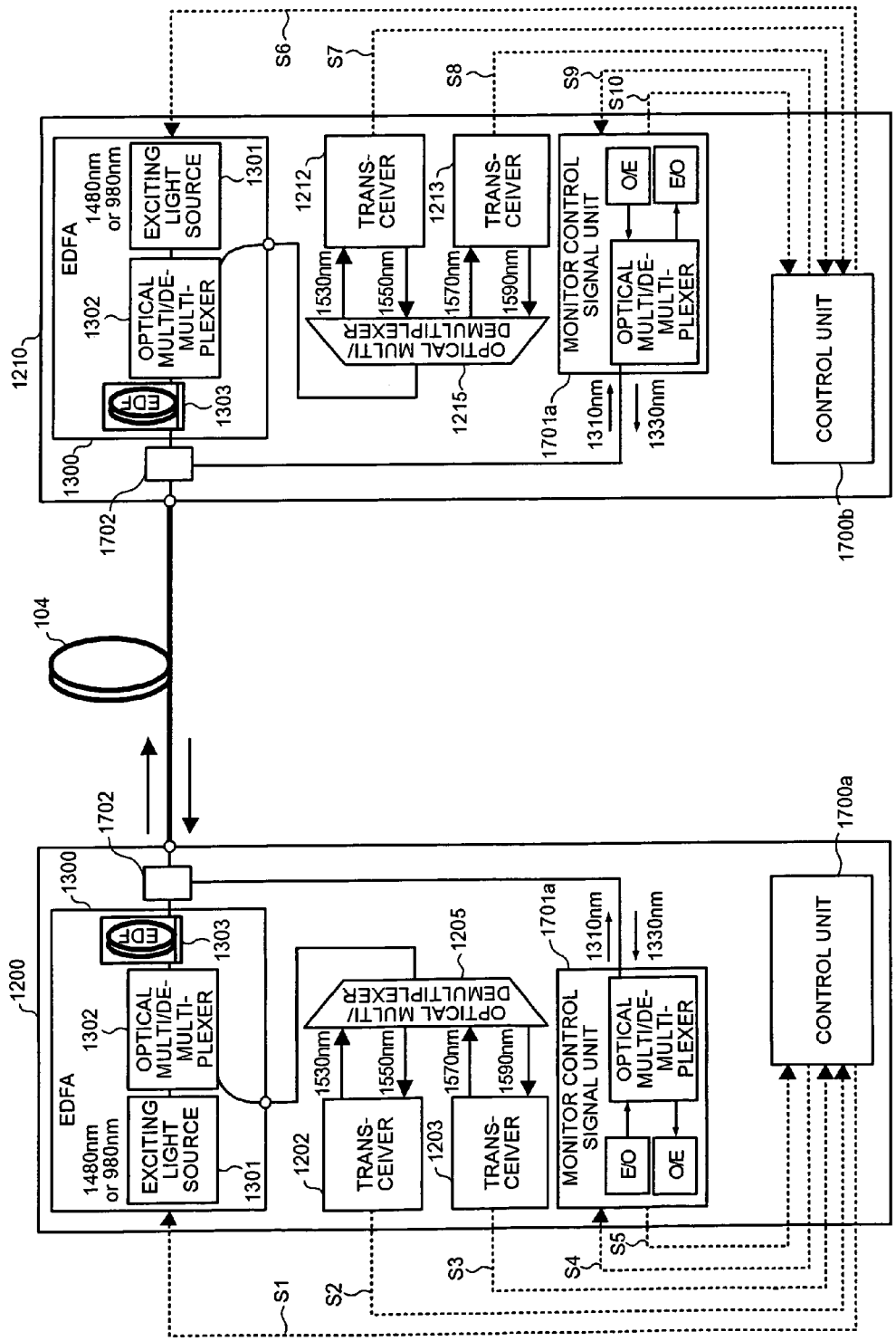
FIGS. 17A and 17B are diagrams of an optical terminal apparatus when pumping light source control is performed.
Figure 17B:
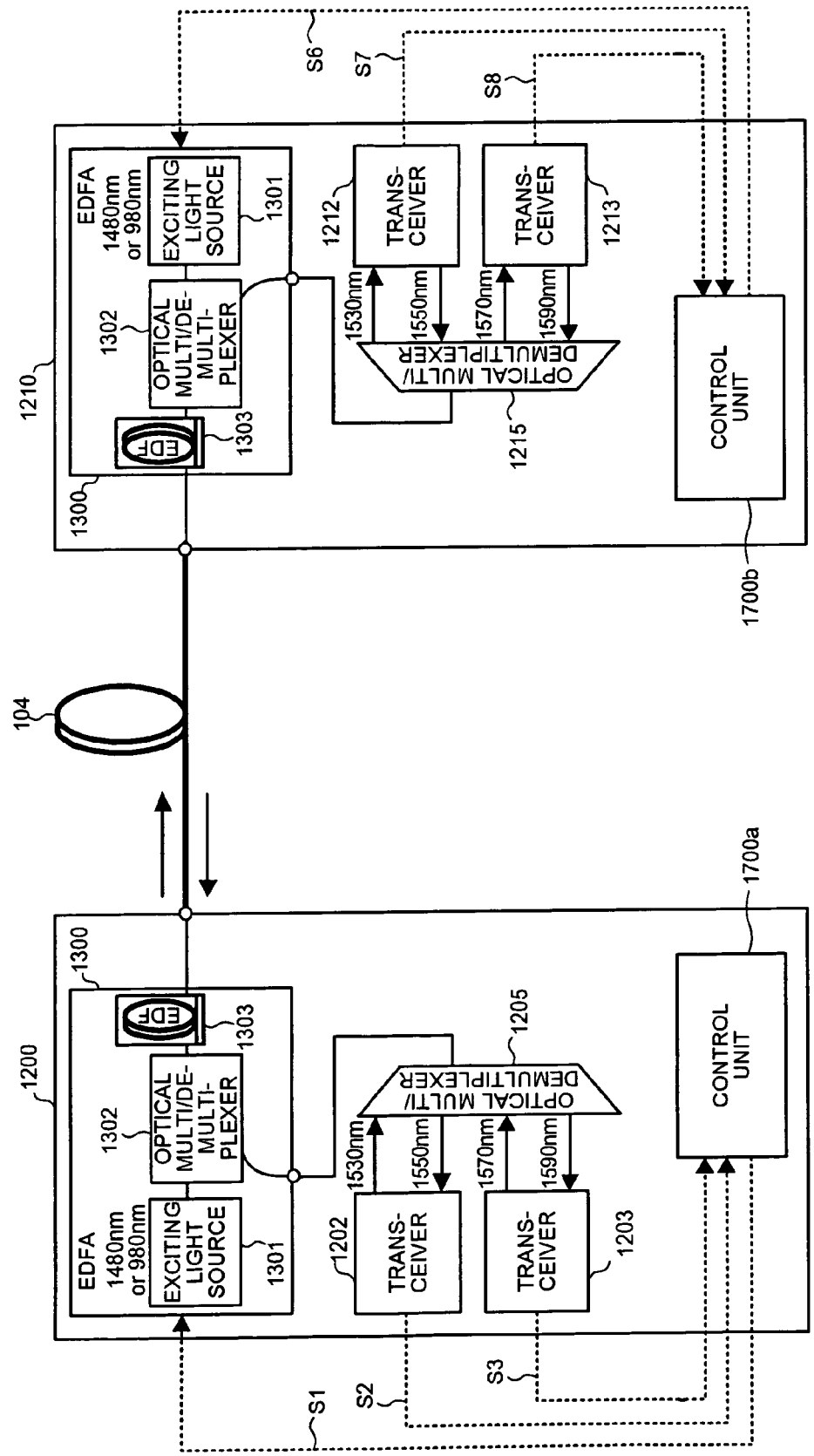

FIGS. 17A and FIG. 17B are diagrams of optical terminal apparatuses used when pumping light source control is performed. Methods of performing pumping light source control of the optical terminal apparatus include a method of arranging a monitor control signal unit to perform pumping light source control by a monitor control signal and a method of performing pumping light source control by only a control unit without using a monitor control signal unit.

A case in which pumping light source control is performed by a monitor control signal from a monitor control signal unit will be described below with reference to FIG. 17A. An optical terminal apparatus 1200 and an optical terminal apparatus 1210 are obtained by adding a control unit 1700a, a monitor control signal unit 1701a (in the optical terminal apparatus 1200), a control unit 1700b, a monitor control signal unit 1701b (in the optical terminal apparatus 1210), and a signal separation filter 1702 to the optical terminal apparatus 1200 and the optical terminal apparatus 1210 shown in FIG. 13. Each of the monitor control signal units 1701a and 1701b includes an E/O unit, an O/E unit, and an optical multiplexer/demultiplexer.

The control unit 1700a of the optical terminal apparatus 1200 is connected as described below to transmit and receive pieces of information.

S1: control unit 1700a→EDFA 1300 (control information of pumping light)

S2: transceiver 1202→control unit 1700a (reception level information of transceiver 1202)

S3: transceiver 1203→monitor control signal unit 1700a (reception level information of transceiver 1203)

S4: control unit 1700a→monitor control signal unit 1701a (reception level information of transceiver 1202 and transceiver 1203)

S5: monitor control signal unit 1701a→control unit 1700a (reception level information of transceiver 1212 and transceiver 1213).

The control unit 1700b of the optical terminal apparatus 1210 is connected as described below and transmits and receives pieces of information.

S6: control unit 1700b→EDFA 1300 (control information of pumping light)

S7: transceiver 1212→control unit 1700b (reception level information of transceiver 1212)

S8: transceiver 1213→monitor control signal unit 1701b (reception level information of transceiver 1213)

S9: control unit 1700b→monitor control signal unit 1701b (reception level information of transceiver 1212 and transceiver 1213)

S10: monitor control signal unit 1701b→control unit 1700b (reception level information of transceiver 1202 and transceiver 1203).

The pieces of reception level information of the transceiver 1202 and the transceiver 1203 are transmitted from the monitor control signal unit 1701a to the signal separation filter 1702 and multiplexed with a signal light. The multiplexed wave is demultiplexed by the signal separation filter 1702 of the optical terminal apparatus 1210 through the transmission path 104 and received by the monitor control signal unit 1701b. Similarly, the pieces of reception level information of the transceiver 1212 and the transceiver 1213 are received by the monitor control signal unit 1701a of the optical terminal apparatus 1200. The control units can adjusts an output of a pumping light source in the EDFA 1300 on the basis of the received pieces of information such that a different between transmission/reception levels of corresponding transceivers is not generated. The control contents of a pumping light is the same as those of the pumping light source control (see FIG. 11), and a description thereof will be omitted. The control unit 1700a and the control unit 1700b control a post-amplifier function that amplifies a transmission signal light.

A case in which pumping light source control is performed by only a control unit without using a monitor control signal unit will be described below with reference to FIG. 17B. The configurations of the optical terminal apparatus 1200 and the optical terminal apparatus 1210 are configurations obtained by removing the monitor control signal unit 1701 and the signal separation filter 1702 from the configuration in FIG. 17A. Connections from the control units 1700 (1700a and 1700b) and pieces of information transmitted and received by the control units 1700 are indicated by S1 to S3 and S6 to S8 shown in FIG. 17A.

When pumping light source control is performed by only the control units 1700 (1700a and 1700b) without using the monitor control signal unit 1701, an output of a pumping light source of the EDFA 1300 is adjusted on the basis of reception level information of transceivers in own apparatus such that a reception level difference of the transceivers in the same optical terminal apparatus is not generated. The control unit 1700a and the control unit 1700b control a pre-amplifier function which amplifies a reception signal light.

As described above, according to the optical terminal apparatus of the second embodiment, units of an EDFA can be mounted in a conventional optical terminal apparatus to make it possible to omit a cumbersome operation and a cost for arranging a new external amplifier and to prevent an optical terminal apparatus from being increased in size by adding a large-scale unit.

Figure 18:
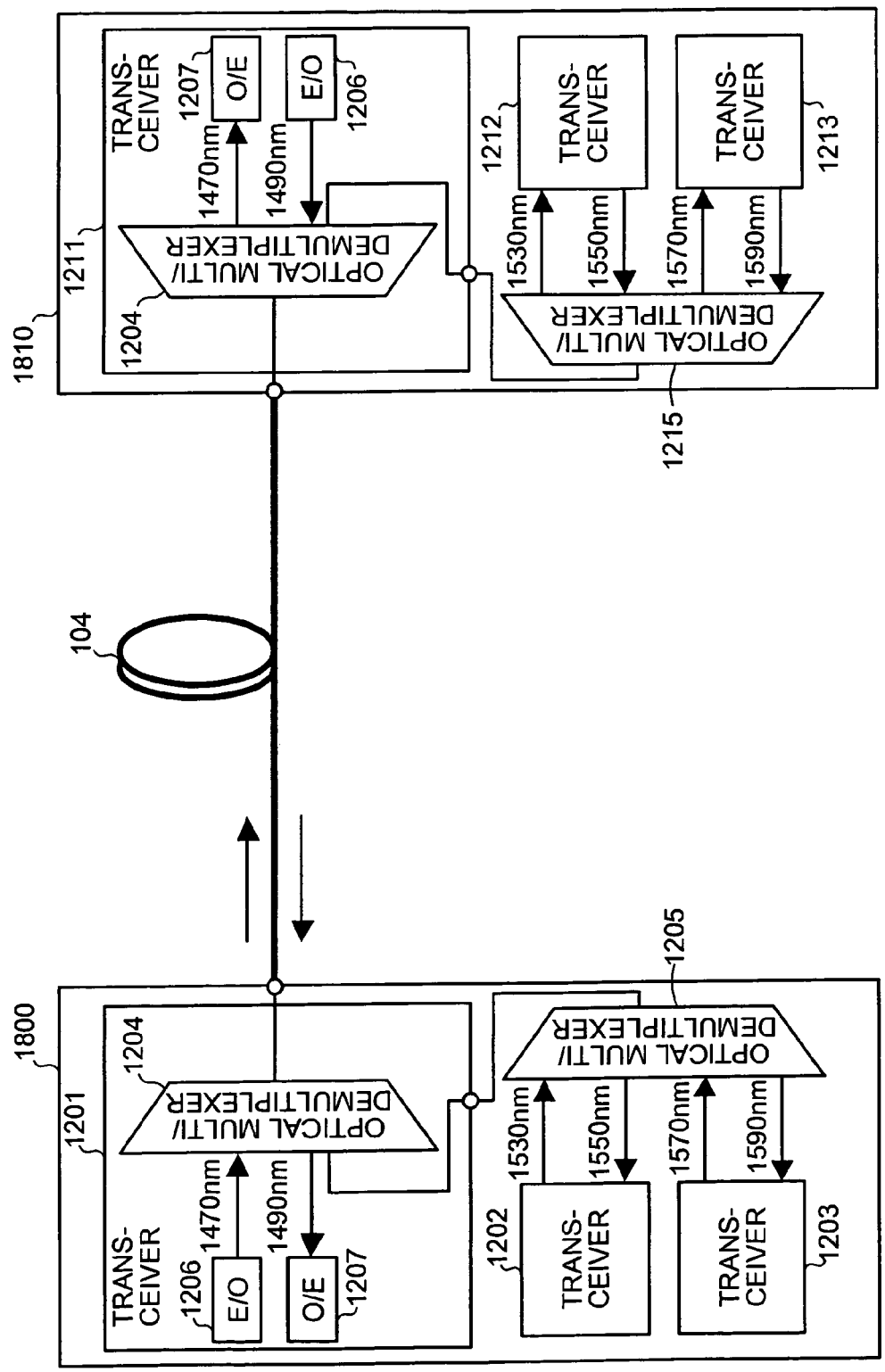
FIG. 18 is a diagram of a basic configuration of an optical terminal apparatus according to a third embodiment.

FIG. 18 is a diagram of a basic configuration of an optical terminal apparatus according to the third embodiment. An optical terminal apparatus 1800 is constituted by a transceiver 1201, a transceiver 1202, a transceiver 1203, and an optical multiplexer/demultiplexer 1205. The transceiver 1201 incorporates an optical multiplexer/demultiplexer, and can be replaced with the unit of an EDFA. In the transceiver 1202 and the transceiver 1203, multiplexing/demultiplexing is performed by the optical multiplexer/demultiplexer 1205.

Similarly, an optical terminal apparatus 1810 includes a transceiver 1211, a transceiver 1212, a transceiver 1213, and an optical multiplexer/demultiplexer 1215. The transceiver 1211 incorporates an optical multiplexer/demultiplexer, and can be replaced with the unit of an EDFA. In the transceiver 1212 and the transceiver 1213, multiplexing/demultiplexing is performed by the optical multiplexer/demultiplexer 1215. The transceiver 1201 to the transceiver 1203 and the transceiver 1211 to the transceiver 1213 include E/O units 1206 which convert transmission signals into transmission signal lights and O/E units 1207 which convert reception signal lights into reception signals as shown in the transceiver 1201 and the transceiver 1211.

Types of light sources of the transceivers will be determined as follows:

Transceivers arranged in the optical terminal apparatus 1800:
    transceiver 1201: 1470 nm (for transmission), 1490 nm (for reception)
    transceiver 1202: 1530 nm (for transmission), 1550 nm (for reception)
    transceiver 1203: 1570 nm (for transmission), 1590 nm (for reception)

Transceivers arranged in the optical terminal apparatus 1810:
    transceiver 1211: 1490 nm (for transmission), 1470 nm (for reception)
    transceiver 1212: 1550 nm (for transmission), 1530 nm (for reception)
    transceiver 1213: 1590 nm (for transmission), 1570 nm (for reception)

The optical multiplexer/demultiplexers built in the transceiver 1201 and the transceiver 1211 are constituted by WDM couplers which multiplex/demultiplex lights having wavelengths of 1470 nm and 1490 nm. The optical multiplexer/demultiplexers 1205 and 1215 are constituted by WDM couplers which multiplex/demultiplex lights having wavelengths of 1530 nm, 1550 nm, 1570 nm, and 1590 nm. Therefore, the optical terminal apparatus 1800 and the optical terminal apparatus 1810 have a configuration in which the transceiver 1201, the transceiver 1202, and the transceiver 1203 correspond to the transceiver 1211, the transceiver 1212, and the transceiver 1213, respectively, and which has three bidirectional optical transmission paths.

Figure 19:
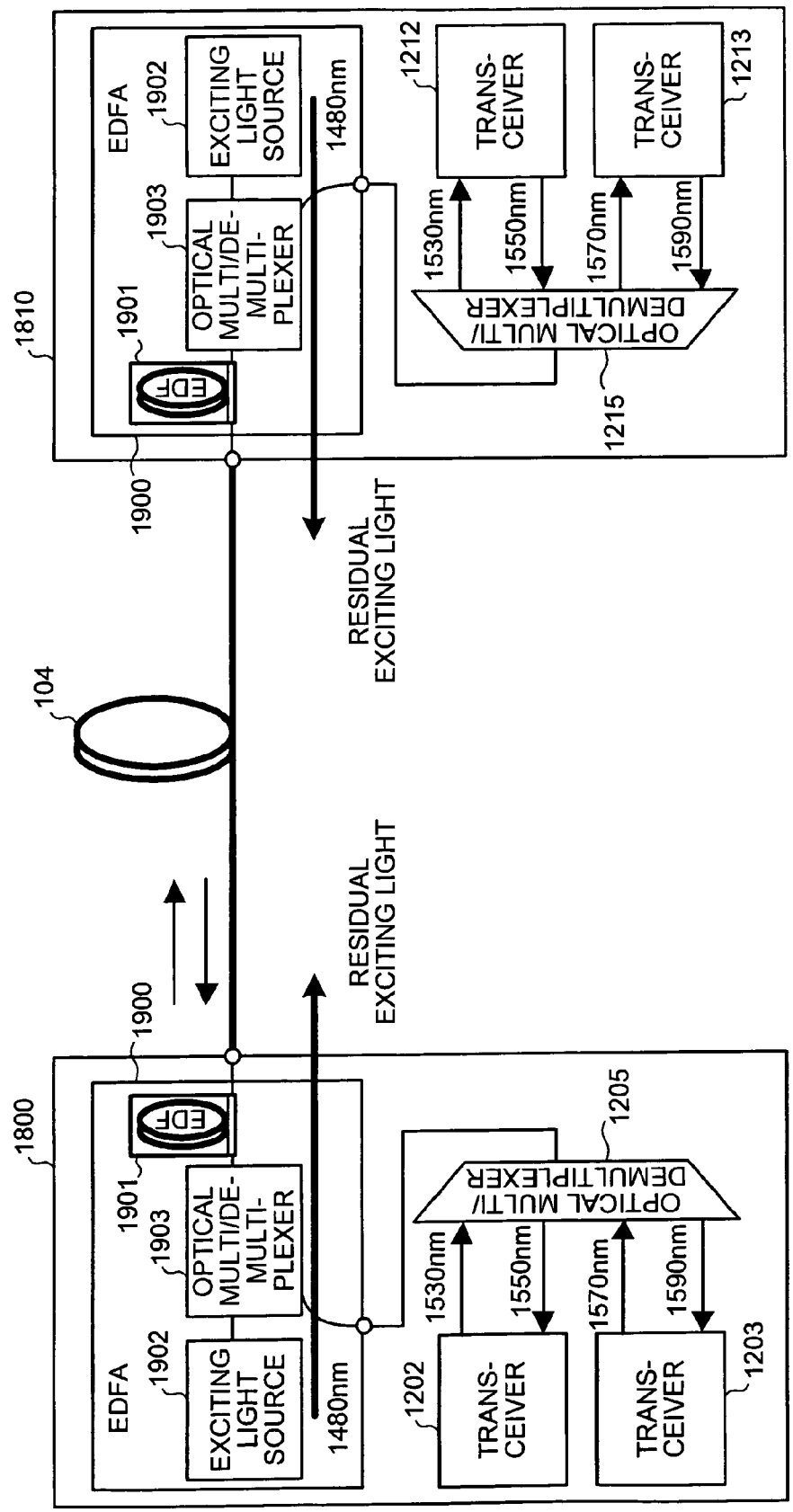
FIG. 19 is a diagram of a configuration used when optical amplification is performed by an EDFA and Raman amplification.
Figure 20:
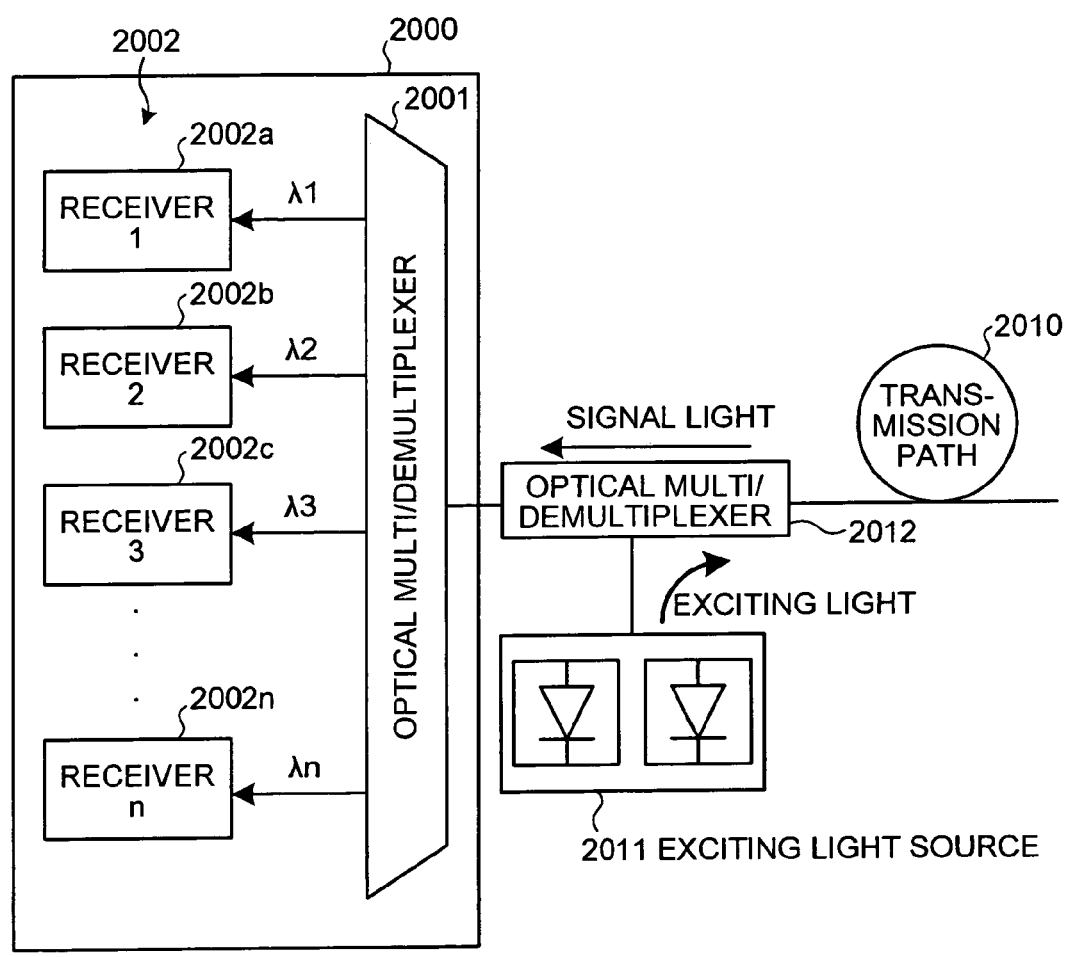
FIG. 20 is a diagram of a configuration which performs Raman amplification in DWDM optical transmission.

FIG. 19 is a diagram of a configuration used when a signal light is amplified by an EDFA and Raman amplification. The transceiver 1201 of the optical terminal apparatus 1800 shown in FIG. 18 and the transceiver 1211 of the optical terminal apparatus 1810 shown in FIG. 18 are replaced with EDFAs 1900, respectively, to make it possible to perform Raman amplification simultaneously with amplification performed by an EDFA described in the second embodiment.

The EDFA 1900 has a structure including an EDFA 1901, a pumping light source 1902 which inputs a light having a wavelength of 1480 nm as a pumping light to the EDFA 1901, and an optical multiplexer/demultiplexer 1903 which multiplexes/demultiplexes pumping lights and the signal lights. Inductive emission is caused by the EDFA 1901 using a pumping light having a wavelength of 1480 nm to perform amplification to a light having a wavelength in a 1550-band. In addition, a pumping light (residual pumping light) which is not adsorbed by the EDFA 1901 is transmitted to the transmission path 104 to perform Raman amplification by using a light having a wavelength of 1580 nm as the maximum gain band. In this manner, according to the configuration in FIG. 19, EDFA and Raman amplification can be simultaneously performed. The optical terminal apparatus 1800 and the optical terminal apparatus 1810 have a configuration which includes two bidirectional optical transmission path which can amplify bidirectional signal lights.

Selection of a wavelength of a pumping light makes it possible to select a wavelength at which Raman amplification is generated. When pumping lights having wavelengths except for 1480 nm and 980 nm are used, a change in population inversion rate of the EDFA 1901 must be considered.

As described above, according to the optical terminal apparatus of the third embodiment, only an EDFA unit is arranged in an optical terminal apparatus to make it possible to perform EDFA and Raman amplification to a signal light. When wavelengths of signal lights are set such that a gain band of EDFA and a gain band of Raman amplification overlap, a transmission distance can be largely extended without arranging an external large-scale amplifier.

According to the optical terminal apparatus of the present invention, since a signal light and a pumping light are multiplexed through the optical multiplexer/demultiplexer to transmit a multiplexed light onto a transmission path, a configuration which multiplexes signal lights by using CWDM can easily amplify the signal lights without arranging a new large-scale amplification device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical terminal apparatus comprising:
an optical multiplexer/demultiplexer; and
a plurality of signal light units connected to the optical multiplexer/demultiplexer, wherein
each connected signal light unit transmits a signal light having a predetermined wavelength,
the predetermined wavelengths of the signal lights transmitted by each of the signal light units are different from each other,
the optical multiplexer/demultiplexer multiplexes together the transmitted signal lights,
the optical multiplexer/demultiplexer receives an optical signal having a plurality of different wavelengths multiplexed together,
the optical multiplexer/demultiplexer demultiplexes the received optical signal into the plurality of different wavelengths,
the demultiplexed plurality of different wavelengths correspond, respectively, to the plurality of connected signal light units,
the connected plurality of signal light units each receive the corresponding, demultiplexed different wavelength,
a respective connected signal light unit is detachably connected to the optical multiplexer/demultiplexer and is thereby replaceable by a pumping light unit which connects to the optical multiplexer/demultiplexer in place of said respective connected signal light unit,
the connected pumping light unit emits pumping light,
the optical multiplexer/demultiplexer multiplexes the emitted pumping light together with the signal lights transmitted by the connected signal light units other than said respective connected signal light unit that has been replaced,
the pumping light is at a predetermined wavelength which causes Raman amplification for at least one of the signal lights multiplexed together with the pumping light, and
the optical multiplexer/demultiplexer is configured to receive both the wavelength of the signal light transmitted by said respective connected signal light unit and the wavelength of the emitted pumping light.

2. The optical terminal apparatus according to claim 1, wherein the optical multiplexer/demultiplexer comprises:
a plurality of couplers corresponding, respectively, to the plurality of connected signal light units, each coupler including
a predetermined band separation filter filtering out the different wavelength corresponding to the signal light unit that corresponds to the respective coupler, and an output port through which the filtered out different wavelength is provided to the corresponding signal light unit.

3. The optical terminal apparatus according to claim 1, further comprising an attachment slot through which the respective connected signal light unit is detachably connected to the optical multiplexer/demultiplexer.

4. The optical terminal apparatus according to claim 1, wherein the predetermined wavelength of the pumping light is shorter than the wavelengths of the transmitted signal lights.

5. The optical terminal apparatus according to claim 1, wherein more than one of the connected signal light units are detachably connected to the optical multiplexer/demultiplexer to be replaceable by pumping light units, and the number of signal light units replaced with pumping light units and the number of pumping lights emitted from the pumping light units are determined so that the number of the pumping lights is equal to number of transmitted signal lights.

6. The optical terminal apparatus according to claim 1, wherein the emitted pumping light causes Raman amplification of at least two of the signal lights multiplexed together with the pumping light.

7. The optical terminal apparatus according to claim 1, wherein the emitted pumping light is forward pumping light.

8. The optical terminal apparatus according to claim 1, wherein the emitted pumping light is backward pumping light.

9. The optical terminal apparatus according to claim 1, wherein the emitted pumping light unit is used for bidirectional Raman pumping.

10. The optical terminal apparatus according to claim 1, wherein the optical multiplexer/demultiplexer receives the optical signal from an optical transmission path through an amplification optical fiber, and outputs the multiplexed pumping light and signal lights to the optical transmission path through the amplification optical fiber.

11. The optical terminal apparatus according to claim 1, wherein
a range of the different wavelengths of the signal lights is from 1450 nanometers to 1610 nanometers, and
the predetermined wavelength of the pumping light is shorter by 100 nanometers than a wavelength of signal light caused to be Raman amplified by the pumping light.

12. The optical terminal apparatus according to claim 1, wherein
the optical multiplexer/demultiplexer includes a filter that demultiplexes a control signal light received from another optical terminal apparatus, and
the optical terminal apparatus further comprises
a control signal light unit that acquires reception level information of the transmitted signal lights in said another optical terminal apparatus based on the control signal light; and
a control unit that controls transmission levels of the signal lights based on the reception level information.

13. The optical terminal apparatus according to claim 12, wherein the control unit performs a temperature control of the pumping light unit based on the acquired reception level information to control the transmission levels of the signal lights.

14. An optical terminal apparatus comprising:
a first signal light unit transmitting a signal light having a predetermined wavelength;
a plurality of second signal light units transmitting a plurality of signal lights, respectively, at predetermined wavelengths, wherein the predetermined wavelengths of the signal lights transmitted by the second signal light units and the predetermined wavelength of the signal light transmitted by the first signal light unit are different from each other; and
a first optical multiplexer/demultiplexer multiplexing together the signal lights transmitted by the second signal light units, to thereby output a multiplexed light, wherein
the first signal light unit is detachably connected between the first optical multiplexer/demultiplexer an a transmission path so that, when connected, the first signal light unit multiplexes together the signal light transmitted by the first signal light unit with the multiplexed light output by the first optical multiplexer/demultiplexer, to provide a further multiplexed light which is provided to the transmission path, the first signal light unit receives an optical signal from the transmission path having different wavelengths multiplexed together, the different wavelengths correspond, respectively, to the first signal light unit and the plurality of second signal light units, the first signal light unit provides the different wavelengths corresponding to the plurality of second signal light units to the first optical multiplexer/demultiplexer, and the first optical multiplexer/demultiplexer demultiplexes the different wavelengths and provides the demultiplexed different wavelengths to the corresponding second signal light units, respectively, the first signal light unit is detachably connected and is thereby replaceable with an erbium-doped fiber amplifier that includes an erbium-doped fiber, a pumping light source that, when the erbium-doped fiber amplifier replaces the first signal light unit, provides a pumping light of a predetermined wavelength, and a second optical multiplexer/demultiplexer that, when the erbium-doped fiber amplifier replaces the first signal light unit, multiplexes the provided pumping light with the multiplexed light output by the first optical multiplexer/demultiplexer to thereby provide a further multiplexed light which is provided to the erbium-doped fiber and thereafter the further multiplexed light is provided to the transmission path.

15. The optical terminal apparatus according to claim 14, wherein the predetermined wavelength of the pumping light is set in accordance with the wavelength of at least one signal light transmitted by a second signal light unit.

16. The optical terminal apparatus according to claim 1, wherein the predetermined wavelength of the signal light transmitted by the respective connected signal unit that is replaceable by the pumping light unit is the same as the wavelength of the emitted pumping light.

17. The optical terminal apparatus according to claim 1, wherein the optical multiplexer/demultiplexer includes a plurality of input ports corresponding, respectively, to the plurality of signal light units, each signal light unit is detachably connected to the corresponding input port, each input port is configured to receive the predetermined wavelength of the signal light transmitted by the corresponding signal light unit, and the predetermined wavelength of the signal light transmitted by said respective connected signal unit that is replaceable by the pumping light unit is the same as the wavelength of the emitted pumping light.

18. An apparatus comprising:
an optical device; and
a plurality of signal light units connected to the optical device, wherein
each connected signal light unit transmits a signal light having a predetermined wavelength, the predetermined wavelengths of the signal lights transmitted by each of the signal light units are different from each other, the optical device multiplexes together the transmitted signal lights, a respective connected signal light unit is detachably connected to the optical device and is thereby replaceable by a pumping light unit which connects to the optical device in place of said respective connected signal light unit, the connected pumping light unit emits pumping light, the optical device multiplexes the emitted pumping light together with the signal lights transmitted by the connected signal light units other than said respective connected signal light unit that has been replaced, and the pumping light is at a predetermined wavelength which causes Raman amplification for at least one of the signal lights multiplexed together with the pumping light.

19. The apparatus as in claim 18, wherein
the optical device receives an optical signal having a plurality of different wavelengths multiplexed together,
the optical device demultiplexes the received optical signal into the plurality of different wavelengths,
the demultiplexed plurality of different wavelengths correspond, respectively, to the plurality of connected signal light units, and
the connected plurality of signal light units each receive the corresponding, demultiplexed different wavelength.

20. The apparatus as in claim 18, wherein the predetermined wavelength of the signal light transmitted by the respective connected signal unit that is replaceable by the pumping light unit is the same as the wavelength of the emitted pumping light.

21. The apparatus as in claim 19, wherein the predetermined wavelength of the signal light transmitted by the respective connected signal unit that is replaceable by the pumping light unit is the same as the wavelength of the emitted pumping light.

22. An optical terminal apparatus comprising:
a plurality of signal light units that transmits and receives a signal light having a predetermined wavelength;
at least one pumping light unit that emits a pumping light having a predetermined wavelength to perform Raman amplification for the signal light transmitted; and
an optical multiplexer/demultiplexer that multiplexes/demultiplexes the signal light and the pumping light, the optical multiplexer/demultiplexer having one end connected to an optical transmission path and other end connected to the signal light units and the pumping light unit, wherein
the optical multiplexer/demultiplexer is a wavelength division multiplexing coupler,
the wavelength division multiplexing coupler includes
a plurality of input/output ports to which the signal light units or the pumping light unit is connected, and
a predetermined band separation filter for each of the input/output ports, and
the wavelength division multiplexing coupler has a wavelength band that is enough to multiplex/demultiplex the signal light and the pumping light.

23. An optical terminal apparatus comprising:
a plurality of signal light units that transmits and receives a signal light having a predetermined wavelength;

at least one pumping light unit that emits a pumping light having a predetermined wavelength to perform Raman amplification for the signal light transmitted;

an optical multiplexer/demultiplexer that multiplexes/demultiplexes the signal light and the pumping light, the optical multiplexer/demultiplexer having one end connected to an optical transmission path and other end connected to the signal light units and the pumping light unit; and a predetermined number of attachment slots to which the signal light units or the pumping light unit are attached, wherein the signal light units and a predetermined number of pumping light units instead of the signal light units can be freely attached to the attachment slots.

24. An optical terminal apparatus comprising:

a plurality of signal light units that transmits and receives a signal light having a predetermined wavelength;

at least one pumping light unit that emits a pumping light having a predetermined wavelength to perform Raman amplification for the signal light transmitted; and an optical multiplexer/demultiplexer that multiplexes/demultiplexes the signal light and the pumping light, the optical multiplexer/demultiplexer having one end connected to an optical transmission path and other end connected to the signal light units and the pumping light unit, wherein the optical multiplexer/demultiplexer includes a filter that demultiplexes a control signal light received from other optical terminal apparatus via the optical transmission path, and the optical terminal apparatus further comprises a control signal light unit that acquires reception level information of the signal light in the other optical terminal apparatus based on the control signal light; and a control unit that controls a transmission level of the signal light based on the reception level information.

25. The optical terminal apparatus according to claim 24, wherein the control unit performs a temperature control of the at least one pumping light unit based on the reception level information to control the transmission level of the signal light.

* * * * *

UNITED STATES PATENT AND TRADEMARK OFFICE
CERTIFICATE OF CORRECTION

| | |
|---|---|
| PATENT NO. | : 7,349,150 B2 |
| APPLICATION NO. | : 11/044232 |
| DATED | : March 25, 2008 |
| INVENTOR(S) | : Tsukasa Takahashi et al. |

It is certified that error appears in the above-identified patent and that said Letters Patent is hereby corrected as shown below:

Title Page, Column 2 (Other Publications), Line 3, change "May 2, 2003" to --May 1, 2003--.

Column 22, Line 66, change "an" to --and--.

Signed and Sealed this

Second Day of September, 2008

JON W. DUDAS
*Director of the United States Patent and Trademark Office*